US012283442B2

(12) United States Patent
Bharadwaj

(10) Patent No.: US 12,283,442 B2
(45) **Date of Patent: *Apr. 22, 2025**

(54) ONE-WAY VISIBILITY KEYCAPS

(71) Applicant: Apple Inc., Cupertino, CA (US)

(72) Inventor: Shravan Bharadwaj, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/451,804

(22) Filed: Aug. 17, 2023

(65) Prior Publication Data

US 2023/0395340 A1 Dec. 7, 2023

Related U.S. Application Data

(63) Continuation of application No. 17/344,337, filed on Jun. 10, 2021.

(51) Int. Cl.
*H01H 13/83* (2006.01)
*H01H 13/704* (2006.01)

(52) U.S. Cl.
CPC .......... *H01H 13/83* (2013.01); *H01H 13/704* (2013.01); *H01H 2219/06* (2013.01); *H01H 2219/062* (2013.01)

(58) Field of Classification Search
CPC .. H01H 13/83; H01H 13/704; H01H 2219/06; H01H 2219/062; H01H 2219/016; H01H 2219/039; H01H 13/705; H01H 2231/002; H01H 2219/014; G06F 3/0202
USPC .......... 200/314
See application file for complete search history.

(56) References Cited

U.S. PATENT DOCUMENTS

| | | | |
|---|---|---|---|
| 6,036,326 | A | 3/2000 | Yoshikawa et al. |
| 7,798,831 | B2 | 9/2010 | Sanford et al. |
| 7,942,678 | B2 | 5/2011 | Sanford et al. |
| 8,180,093 | B2 | 5/2012 | Hankey et al. |
| 8,185,084 | B2 | 5/2012 | Terlizzi |
| 8,311,255 | B2 | 11/2012 | Hankey et al. |
| 8,401,219 | B2 | 3/2013 | Hankey et al. |
| 8,564,961 | B2 | 10/2013 | Weber |
| 8,650,925 | B2 | 2/2014 | Hankey et al. |
| 8,687,359 | B2 | 4/2014 | Theobald et al. |
| 8,687,758 | B2 | 4/2014 | Ohmori et al. |
| 8,712,071 | B2 | 4/2014 | Terlizzi et al. |
| 8,820,133 | B2 | 9/2014 | Weber et al. |

(Continued)

FOREIGN PATENT DOCUMENTS

| | | | |
|---|---|---|---|
| CN | 1815652 | A | 8/2006 |
| CN | 202796585 | U | 3/2013 |

(Continued)

*Primary Examiner* — Edwin A. Leon
(74) *Attorney, Agent, or Firm* — Dorsey & Whitney LLP

(57) ABSTRACT

Keyboards and other electronic input devices have a key or keys with glyphs that are invisible to an unaided human eye in a first condition, such as when an underlying display attached to the key is not emitting light. The glyphs are visible through the key or keys when the display emits light. A one-way visibility layer or structure obscures the visibility of the display when viewed from above, but when the display emits light, the light penetrates through the one-way visibility layer, such as by passing through an array of microperforations in the key, and is visible to an onlooker.

20 Claims, 12 Drawing Sheets

(56) References Cited

U.S. PATENT DOCUMENTS

| | | | |
|---|---|---|---|
| 9,118,990 | B2 | 8/2015 | Hankey et al. |
| 9,287,657 | B2 | 3/2016 | Hankey et al. |
| 9,294,830 | B2 | 3/2016 | Terlizzi |
| 9,384,916 | B1 | 7/2016 | Matsuoka et al. |
| 9,506,629 | B2 | 11/2016 | Weber |
| 9,704,670 | B2 * | 7/2017 | Leong .................. G06F 3/0202 |
| 9,854,343 | B2 | 12/2017 | Hankey et al. |
| 9,967,646 | B2 | 5/2018 | Hankey et al. |
| 10,152,081 | B2 | 12/2018 | Theobald et al. |
| 10,165,346 | B2 | 12/2018 | Hankey et al. |
| 10,313,775 | B2 | 6/2019 | Hankey et al. |
| 10,433,043 | B2 | 10/2019 | Hankey et al. |
| 10,474,189 | B2 | 11/2019 | Theobald et al. |
| 10,590,600 | B1 | 3/2020 | Wang et al. |
| 10,771,880 | B1 | 9/2020 | Hankey et al. |
| 10,959,006 | B2 | 3/2021 | Hankey et al. |
| 10,979,796 | B2 | 4/2021 | Hankey et al. |
| 10,984,969 | B1 * | 4/2021 | Wang .................... G06F 3/0202 |
| 10,993,011 | B2 | 4/2021 | Hankey et al. |
| 11,398,359 | B2 * | 7/2022 | Wang ........................ G06F 3/02 |
| 2006/0120790 | A1 * | 6/2006 | Chang .................. G06F 3/0238 400/490 |
| 2007/0165002 | A1 | 7/2007 | Wassingbo |
| 2007/0295588 | A1 | 12/2007 | Kamata |
| 2008/0131184 | A1 | 6/2008 | Brown et al. |
| 2008/0247172 | A1 | 10/2008 | Beeson et al. |
| 2009/0040790 | A1 | 2/2009 | Payne |
| 2010/0026632 | A1 | 2/2010 | Ishida et al. |
| 2011/0011711 | A1 | 1/2011 | Lin |
| 2012/0154289 | A1 | 6/2012 | Mahowald et al. |
| 2012/0217147 | A1 | 8/2012 | Porter et al. |
| 2013/0265799 | A1 | 10/2013 | Chuang et al. |
| 2015/0083561 | A1 | 3/2015 | Han et al. |
| 2016/0306437 | A1 | 10/2016 | Zhang et al. |
| 2018/0040441 | A1 | 2/2018 | Wu et al. |
| 2018/0313528 | A1 | 11/2018 | Morrison et al. |
| 2019/0050619 | A1 | 2/2019 | Kern et al. |
| 2020/0033912 | A1 | 1/2020 | Theobald et al. |
| 2022/0399172 | A1 * | 12/2022 | Bharadwaj ........... H01H 13/704 |

FOREIGN PATENT DOCUMENTS

| | | | |
|---|---|---|---|
| CN | 104299831 | A | 1/2015 |
| JP | 2006164929 | A | 6/2006 |
| JP | 2006277013 | A | 10/2006 |
| JP | 2012108864 | A | 6/2012 |
| JP | 2015069644 | A | 4/2015 |
| KR | 20190130140 | A | 11/2019 |
| TW | I505311 | B | 10/2015 |
| WO | 2021094600 | A1 | 5/2021 |

* cited by examiner

ONE-WAY VISIBILITY KEYCAPS

CROSS REFERENCE TO RELATED APPLICATIONS

This application is a continuation of U.S. patent application Ser. No. 17/344,337, filed 10 Jun. 2021 and entitled "ONE-WAY VISIBLE KEYCAPS," the entire contents of which is incorporated herein by reference for all purposes.

FIELD

The described embodiments relate generally to keyboards and key mechanisms for electronic device. More particularly, the present embodiments relate to keycaps having illuminable glyphs that are selectively visible or invisible to an unaided human eye.

BACKGROUND

Keyboards for computing devices have many purposes and are used in a wide range of places and times. A keyboard is one of the largest, most prominent, and most used parts of a computer, and as such, plays a crucial role in a user's experience with the device. Keyboards strongly influence the appearance and aesthetic of the computer, the usability and approachability of the device, the user's perception of quality, the tactile and audible feedback provided to the user, and more.

Keyboard keys often include legends or glyphs used to identify the functions of each key. Also, to improve ease of use of a keyboard in low light conditions, many keyboards provide backlighting that illuminates the keys or glyphs. In many instances, the keycaps are designed to be thin and inexpensive, thereby leading them to be made of plastic and with painted-on or top-coated glyph material. Painted or coated keycaps tend to have low durability due to their repeated contact with fingers, especially when the user has oily or dirty hands, thereby causing the glyphs to rub off or to become unreadable over time. Additionally, because the keycaps are made of plastic, they tend to have a lower quality feel and timbre as compared to other materials.

Makers and users of keyboard devices are constantly seeking improvements to these technologies to better serve the needs of makers and users of computer products.

SUMMARY

An aspect of the present disclosure relates to a key mechanism, including a keycap including a top surface, a bottom surface, and an array of perforations through the top and bottom surfaces, an array of lights attached to the bottom surface of the keycap, wherein each single light of the array of lights illuminates a single respective perforation of the array of perforations, a base plate positioned below the keycap and the array of lights, and a switch to detect movement of the keycap relative to the base plate.

In some embodiments, the array of perforations is arranged in a rectangular grid. The array of perforations can be invisible to an unaided human eye. The array of perforations can include at least one perforation having a tapering diameter. The keycap can further include an at least partially transparent material at least partially filling at least some of the perforations of the array of perforations. The array of lights can be controllable to selectively display a first glyph or a second glyph through the array of perforations. The keycap can include an opaque side wall preventing light from the array of lights from passing below the keycap.

Another aspect of the disclosure relates to a keyboard assembly including a housing, a substrate positioned in the housing, and a set of key mechanisms positioned in the housing over the substrate, with each key mechanism of the set of key mechanisms including a keycap having a top surface and a bottom surface, a light source positioned under the bottom surface and movable with the keycap, a switch to detect movement of the keycap relative to the housing, and a controller in electrical communication with the light sources of each key mechanism via the substrate. With the controller in a first configuration, each top surface of each keycap of each key mechanism can have a uniform appearance, and with the controller in a second configuration, each light source of each key mechanism can generate a glyph, with the glyphs being visible through the top surfaces of the keycaps.

In some embodiments, with the controller in the first configuration, no glyphs are visible at the top surfaces of the keycaps of the key mechanisms. At least the top surfaces of the keycaps can include a visually identical material to a surface of the housing surrounding the keycaps. The keycap can include an array of perforations invisible to an unaided human eye. With the controller in a third configuration, each light source of each key mechanism can generate a second glyph, with the second glyphs being visible through the top surfaces of the keycaps. The keycap can include a set of openings respectively corresponding to a set of lighting devices of the light source at a 1-to-1 ratio. With the controller in the second configuration, light emitted from each light source can be configured to be only visible after passing through the top surfaces of the keycaps.

Yet another aspect of the disclosure relates to an electronic input device, including a housing, a transparent keycap body having a bottom surface, a light display attached to the transparent keycap body and positioned below the bottom surface of the transparent keycap body, a one-way visibility layer positioned above the light display, a collapsible dome switch positioned between the housing and the light display, and a power source connected to the light display. The light display can be configured to emit light in response to power being provided to the light display by the power source, and the light is visible through the one-way visibility layer and through the transparent keycap body, and with the light display not emitting light, the light display can be visually obscured by the one-way visibility layer.

In some embodiments, the one-way visibility layer includes an array of microperforations through which the light can pass, or light transmissible microperforations. The one-way visibility layer can include a one-way mirrored portion. The one-way visibility layer can also be attached to the bottom surface of the transparent keycap body. The light display can include an array of light sources arranged in a rectangular grid. The housing can include a surface surrounding a perimeter of the transparent keycap body and having a visual appearance matching the one-way visibility layer.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
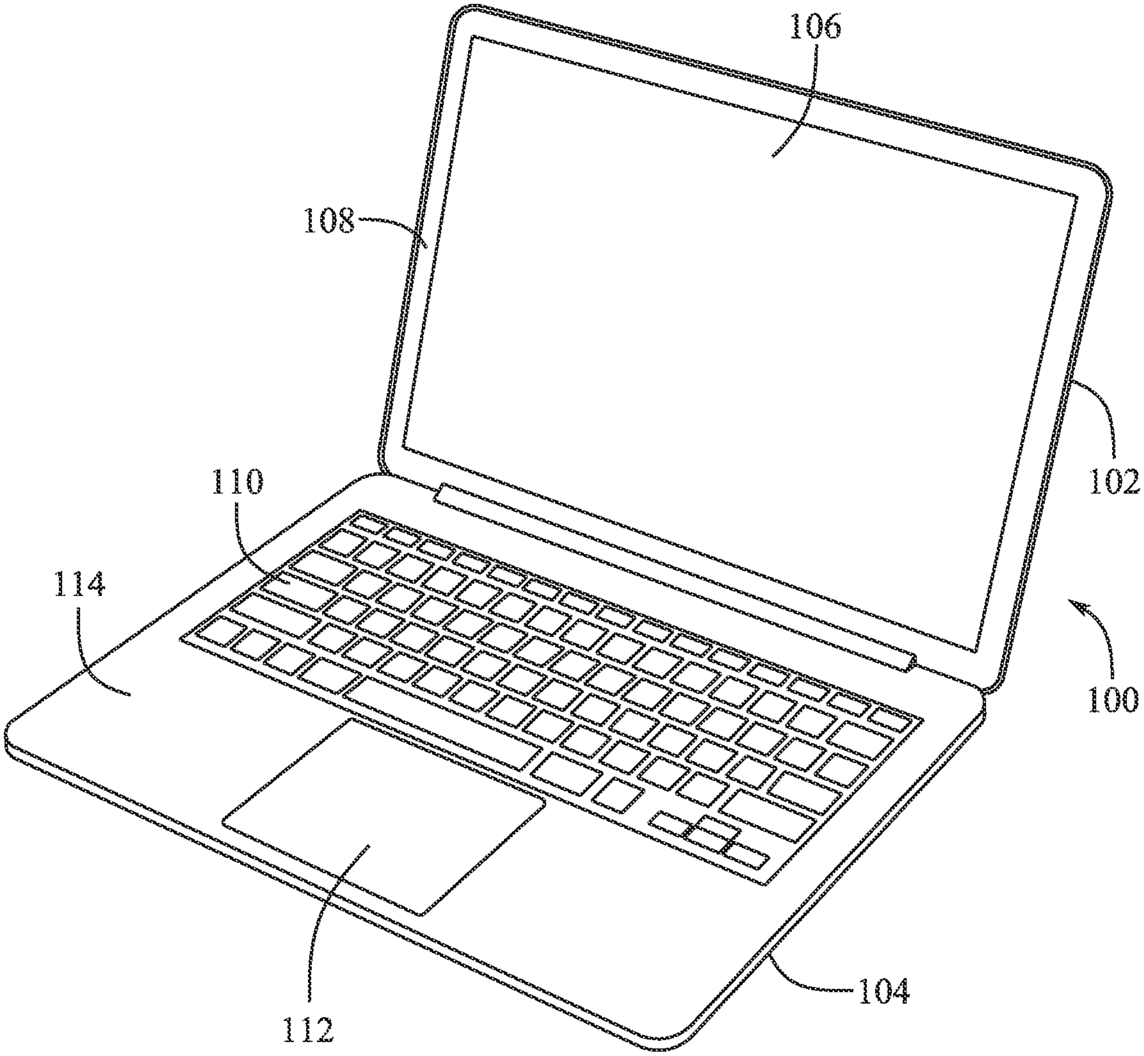
FIG. 1 shows a computing device according to an embodiment of the present disclosure.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Aspects of the present disclosure relate to keyboards used with computing devices that have high durability, high visibility, and user-friendliness, a comfortable and high-quality feel, and that provide customizability and a unique aesthetic appearance. In one instance, a keyboard can include keycaps that have a uniform and clean appearance when the keyboard is inactive, such as when it is not being used or when the computing device to which the keyboard is connected is not being used. Thus, the keycaps can appear blank, lacking any glyphs or symbols that would be visible to an unaided human eye on a normal keyboard, even under close examination. In some embodiments, the keycaps can also have an appearance that matches or closely approximates the appearance of the housing of the keyboard in which the keyboard key mechanisms (including the keycaps) are positioned.

When the keyboard is activated, however, glyphs for each of the keycaps can appear on the keys due to light emitted through the keycaps from beneath the top surfaces of the keycaps. The glyphs can appear to float due to individual light sources or displays that are positioned on or under each of the keycaps. Thus, all of the light output by the light sources or displays can be directed through the top of the keycaps to generate the glyphs, as compared to conventional keyboards where light typically bleeds between adjacent keycaps or is visible between or below the keycaps.

In various embodiments, the glyphs can become visible when the keyboard is activated because the light sources or displays for each key emit light through perforations in the surface of the keycaps (or a structure under a light-transmissive portion) that guide the light from an array of lights/light emitting devices (e.g., microscopic light emitting diodes (LEDs)) positioned under the perforations. Each light of the array of lights can comprise a single light source (e.g., a single LED) or a single set of grouped, pixel-like light source (e.g., an RGB LED having a single set of unique red, green, and blue LEDs used for a single point of light output). These perforations can be microscopic perforations (i.e., microperforations) that are small enough to be invisible to an unaided human eye when light is not illuminating them from below, but when light passes through them from below, the light can be seen through the perforations, such as when the light is viewed along their longitudinal axes. Each light of the array of lights can correspond to a single perforation, such as a single LED (or a single set of RGB LEDs) being aligned with a single perforation for each of the LEDS/perforations in the assembly.

Using this construction, the keycaps of the keyboard can be made with materials not typically used in keycaps for conventional keyboards, such as metals including aluminum. Accordingly, the keycaps of the keyboard can have top surfaces that match the appearance of the housing surfaces of the keyboard surrounding the keycaps that may also have metal surfaces. This can contribute to an overall clean appearance of the keyboard resting in its housing and can further enhance the "floating" effect of the lighted glyphs by making the boundaries between the keycaps and their housing (e.g., including a web extending between keys) less prominent.

In some embodiments, the light sources or displays can include an array of LEDs such as a display using micro-LED or OLED pixels. The perforations in the keycaps can correspond in number to the pixels of the display so that, for example, each single pixel of the display can provide light to one single perforation. In this manner, the displays/light sources can be controlled to generate glyphs that are changeable or adjustable between different shapes, letters, colors, symbols, animations, languages, and other features. For instance, a controller of the keyboard can be used to control the displays to change between different keyboard layouts (e.g., QWERTY, QWERTZ, Colemak, etc.), different keyboard standards or languages (e.g., ANSI, ISO, JIS, Korean, Chinese, etc.), and different symbols or customizable glyphs (e.g., emoji, icons, system controls like power, volume, or brightness, application-specific function indicators, etc.). In some embodiments, the key displays can be controlled to show animations, video, or other changing information over time in one key or a group of keys. Thus, these keycaps can enable interactivity with the keyboard in engaging and pleasing ways for users, while also having a subdued, refined, and uniform appearance while not being used.

Additionally, some keyboards of the present disclosure can include transparent keycap bodies upon which a one-way visibility layer is deposited or attached. The one-way visibility layer can obscure the visibility of a display or light source attached to the keycap below the layer by reflecting light at an outer surface while still allowing light to pass through the layer from an inner side when the display or light source is activated. The one-way visibility layer can include a one-way minor or a layer of opaque material having an array of microperforations that allow one-way visibility similar to the microperforations described above. In one embodiment, the keycap body can include transparent glass and the visibility layer can include a paint applied to the bottom surface of the keycap body that is micro-perforated in a way that aligns the perforations with pixels of a display attached below the paint layer. In another embodiment, the keycap body can include a layer with a metallic physical vapor deposition (PVD) coating to create the one-way mirror effect. The glass surface of the keycaps can have a pleasing, cool-temperature, high-quality feel and can be designed to mimic the appearance of the housing surrounding the keycaps, a housing of a display (such as the display screen of a laptop computer in which the keyboard is positioned), a trackpad, touchscreen, or other nearby components. Thus, the glass keycaps can enable design features for computing devices that could otherwise not be possible.

These and other embodiments are discussed below with reference to the figures. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates an example embodiment of a computing device 100 having a display housing 102 attached to a keyboard housing 104. The display housing 102 can contain a display screen 106 around which a bezel 108 extends. The keyboard housing 104 can contain a keyboard 110 and a trackpad 112 that are accessible through a top surface 114 of the keyboard housing 104.

The computing device 100 is shown in FIG. 1 as being a laptop computer, but the computing device 100 can include a variety of different types of computing devices, such as notebook computers, desktop computers, tablet computers, smart phones, servers, similar devices, and combinations thereof. Furthermore, the keyboard housing 104 can be a peripheral input device that is connectable to a computing device (e.g., via a wired or wireless connection) such as a standalone keyboard, a number input pad, a trackpad, mouse, or other pointer input device, a graphic pen tablet, similar devices, and combinations thereof. Thus, the computing device 100 is shown merely as an example device with which aspects of the present disclosure are illustrated for convenience.

Generally, with a laptop computer like computing device 100, a processor, memory device, electronic storage device, portable power source or power source connector, circuit boards, keyboard and trackpad controllers, and other related electronic components can be stored in the keyboard housing 104 and/or the display housing 102. Thus, the computing device 100 can include all electrical devices and components necessary for operation of a keyboard 110 including keyboard switches and displays connected to one or more of the keys of the keyboard 110. See also FIG. 10.

Figure 2A:
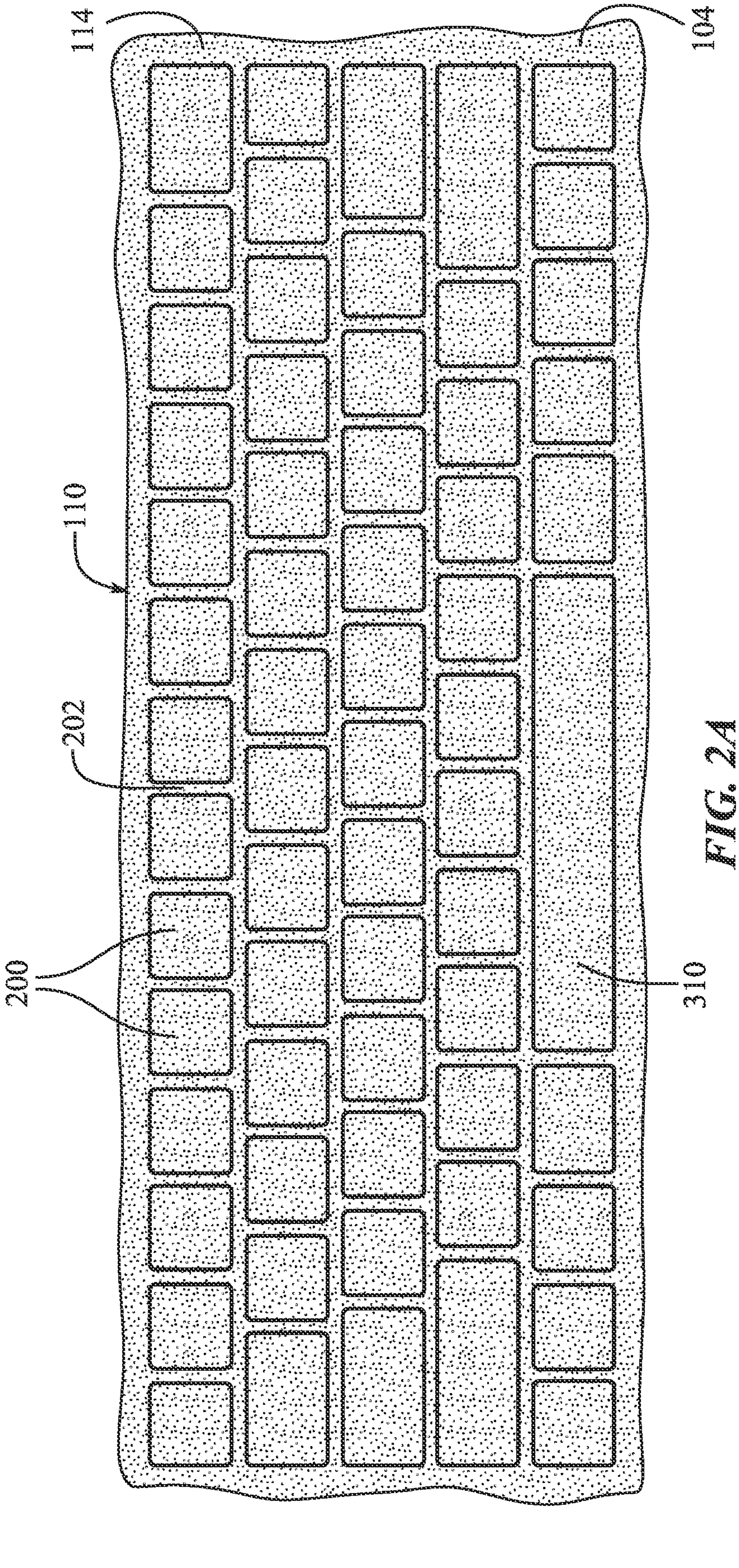
FIG. 2A shows a top view of a keyboard of a computing device in a first condition.

FIG. 2A illustrates a top view of the keyboard 110 positioned in the upper surface 114 of the keyboard housing 104. In this view, the keyboard 110 is inactive and has its glyphs visually hidden. The keyboard 110 includes a set of key mechanisms with keycaps 200 visible at the top of the keyboard 110. In some embodiments, a key web 202 can extend between the keycaps 210 form a mesh-like frame surrounding the perimeter of each of the keycaps 200. The key web 202 can be part of the upper surface 114 of the keyboard housing 104 or can be a separate part positionable between the keycaps 200 and attachable to structures within, or that are part of, the keyboard housing 104.

The material used at the top surface of the keycaps 200 can have a visually identical appearance as the material used for the key web 202 or the top surface 114 that surrounds the perimeter of the keyboard 110. In an example case, the material can be aluminum (e.g., anodized aluminum) or another metal. As used herein, components that have the "same appearance" or that "match in appearance" are components that appear to an unaided human eye to share the same visual reflectivity, surface texture, color (e.g., hue, saturation, and brightness), and opacity/transparency/translucency.

As used herein, an "unaided human eye" is a naked eye of a typical human observer having regular vision and that is not augmented or supplemented by magnifying lenses, microscopes, cameras, or other scopes or equipment used to discern microscopically-sized objects such as the perforations in the keycaps 200 described below. Generally, the unaided human eye, at a normal viewing distance from a keyboard (e.g., about 350 to about 450 millimeters), is incapable of discerning perforations in a surface that are about 0.3 millimeters or less across. At an about 200-250 millimeter viewing distance, the unaided human eye generally cannot distinguish perforations smaller than about 75 microns wide.

However, microscopic light sources, even ones viewed at great distances, can be visible through microscopic perforations. Thus, a material, even metal, can have a "one-way" visibility characteristic wherein when not backlit, an array of perforations in the material can appear visually identical to a piece of the material without the perforations (e.g., with the same reflectivity and other visible characteristics), yet light can easily be seen by the unaided human eye when it passes through the perforations from an underlying light source.

The top surfaces of the keycaps 200 can have a consistent, uniform appearance compared to each other when viewed by an unaided human eye. In other words, the keycaps 200 can have an appearance of a single material composition, and an appearance lacking any visible perforations, glyphs, engravings, additional printed material, or other similar indicators used in keyboards while they are unlit and displays below the top surfaces are not emitting light through the perforations. See also FIGS. 3A-3B.

Figure 2B:
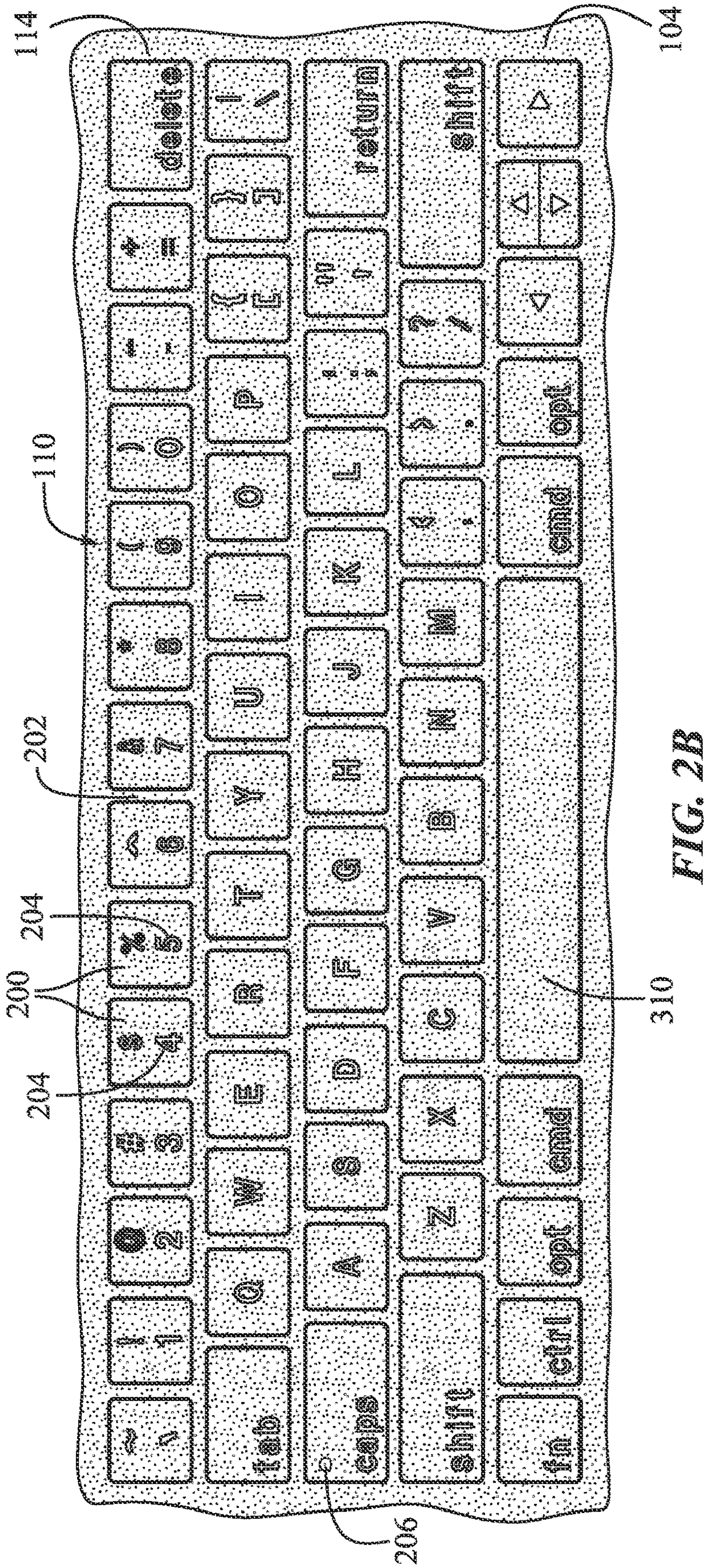
FIG. 2B shows a top view of the keyboard of FIG. 2A in a second condition.

FIG. 2B shows the keyboard 110 when the displays within the keycaps 200 are illuminated to generate glyphs 204. The glyphs 204 can include letters, numbers, symbols, shapes, lines, words, phrases, pictures, and other visual indicators used to convey information to the observer such as the function of the keycap 200 when it is pressed. In some instances, the glyphs 204 can also include indicators for the status or operation of the computing device 100 as a whole, such as a caps lock indicator 206, a volume, brightness, power, or other computer function modifier, a "busy" or "processing" indicator, similar indicators, and combinations thereof.

Figure 3A:
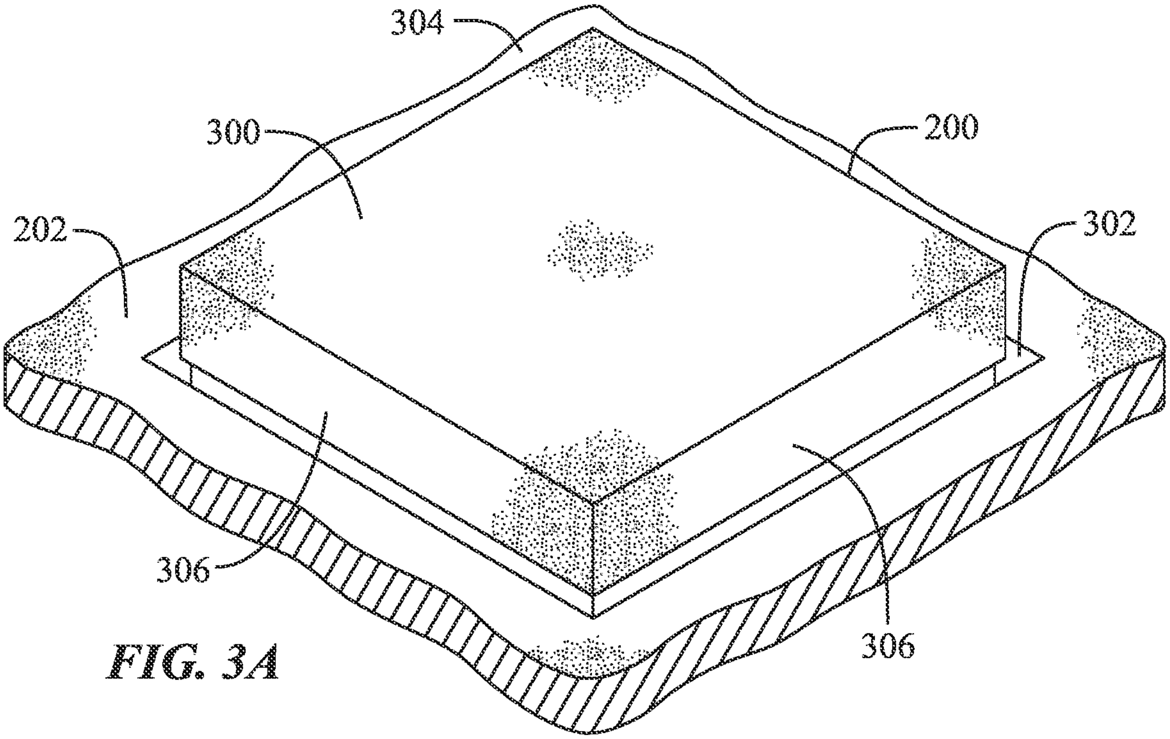
FIG. 3A shows a perspective view of a key mechanism of the keyboard of FIG. 2A.
Figure 3B:
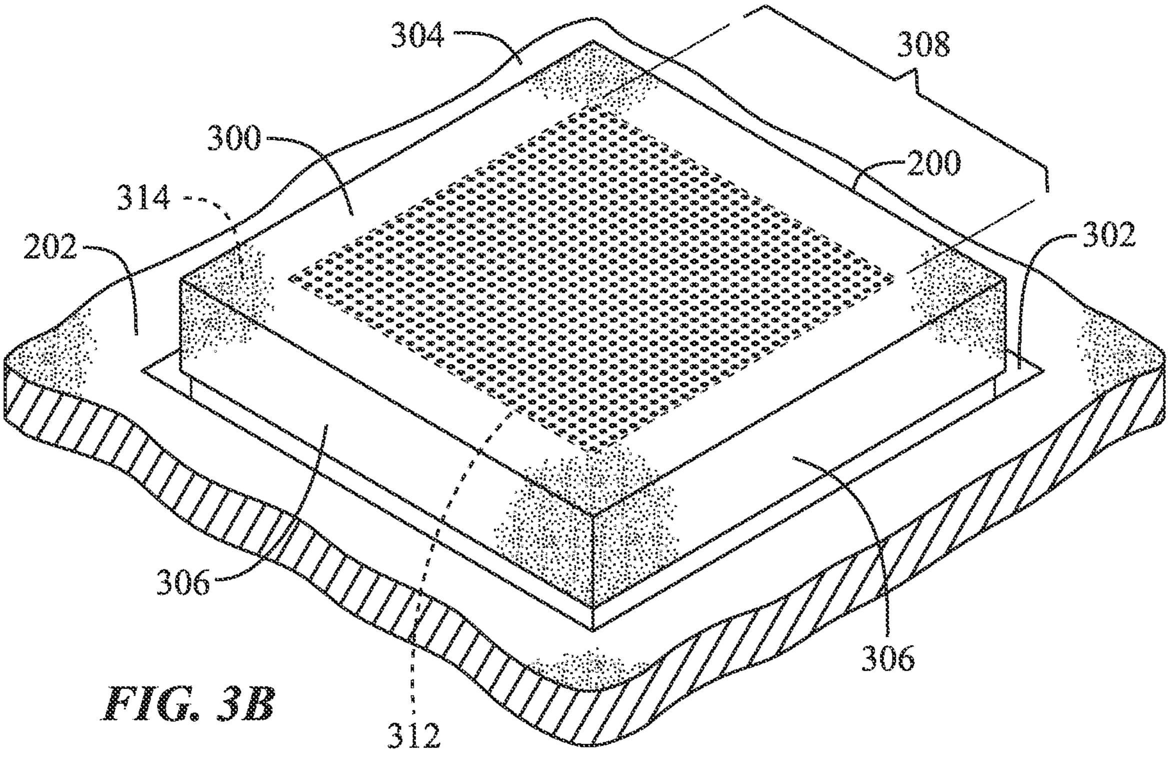
FIG. 3B shows a diagrammatic view of the key mechanism of FIG. 3A in a first condition.

FIG. 3A shows an orthographic view of a keycap 200 positioned in a rigid web 202 and shown separate from other keycaps and key mechanisms of the keyboard 110. This view shows that the top surface 300 of the keycap 200 can have a blank, empty, clean, uniform appearance to an unaided human eye while the display below the top surface 300 is inactive. FIG. 3B shows a similar view to FIG. 3A but with the array of perforations through the top surface 300 simplified and visibly enlarged for the purposes of explanation in the present disclosure. In other words, the keycap 200 would appear to an unaided human eye as it appears in FIG. 3A when not underlit, but FIG. 3B is provided to illustrate where microperforations could be formed in the keycap 200 and how they could appear if they were visible to an unaided human eye.

The key web 202 can include a set of openings 302 through which the keycaps 200 and their associated key mechanisms can extend. The openings 302 can extend through the top surface 304 of key web 202 and can be large enough for the keycaps 200 to travel vertically relative to the key web 202 without contacting the inner edge of the openings 302. In some embodiments, the key web 202 can be omitted, wherein a set of keys 200 of the keyboard 110 can be positioned within a single large opening. In this case, the set of keys can be positioned adjacent to each other with edges of the keycaps spaced apart by gaps, and the gaps can be empty rather than being filled by portions of the key web 202 in the manner shown in FIGS. 2A, 2B, 3A, and 3B.

The keycap 200, and in some examples, at least the top surface 300, or at least the top surface 300 and side surfaces 306, can include a material composition that provides high durability and structural integrity even when a large number of microperforations 308 penetrate through the top surface 300. In one example embodiment, the keycap 200 can at least partially include a metal portion which extends across the top surface 300 and through which the microperforations 308 are formed. The metal portion can beneficially be formed using aluminum and other durable materials that are easily machined and in which the microperforations 308 can be formed using standard industrial processes, such as laser cutting. A metal top surface 300 also beneficially tends to have a high-quality feel, resistance to scratching, resistance to wear, a cool temperature to the touch due to a high heat transfer coefficient, and high rigidity, even at low thicknesses.

Aluminum is also a material that is frequently used in housings of keyboards and other electronic devices (e.g., 104), so the keycaps 200 can have a visual appearance that matches the surrounding enclosure surface 114 and/or web 202, thereby imparting a consistent visual appearance to the top surface of the housing and to the keys themselves. When anodized aluminum is used for a housing 104, anodization of the keycaps 200 (due to their identical material composition) can ensure that the housing 104 and keycaps 200 share the same color, hardness, and other characteristics resulting from the anodization process.

Additionally, when the glyphs 204 are visible, the homogeneity of the appearance of the keycaps 200 and their surrounding housing structures can help create an effect wherein the glyphs 204 appear to “float” above the housing 104 or appear to exist independent of the keycaps 200. When the glyphs 204 are not visible, as illustrated in FIG. 3A, the matching appearance of the keycaps 200 and the housing can make the keycaps 200 blend into the housing and create an appearance of blank keycaps without visible legends.

The microperforations 308 can be formed in arrays that are shaped and sized to correspond to the shape and size of the top surface 300 of the keycap through which they extend. For example, a square keycap 200 with a square top surface 300 can have a substantially square array of microperforations 308, wherein the array has each microperforation equally spaced apart from its neighboring microperforations, and wherein the number of rows of microperforations is equal to the number of columns thereof. In an example embodiment, about 600 microperforations can be part of the array in a single keycap 200, so about 25 rows of microperforations and 25 columns of microperforations, arranged in a grid, can extend across the top surface 300. This number of microperforations and square configuration can be used in keycaps 200 that are square, and for keycaps that are not square, such as a shift key or spacebar, the array of microperforations can be the same or modified to extend across those keys with greater widths or heights than other square keys. For example, the number of columns across a key 310 in FIG. 2A can be about five times higher than the number of columns in a typical square keycap 200 due to having a width about five times greater than the width of a single square key 200.

The number of microperforations in a single key’s array can be determined based on the vertical thickness of the keycap 200 through which the microperforations 308 are formed. A stiffer and stronger keycap 200 material composition (e.g., metal) can support a higher density of microperforations at a given thickness, and a more flexible or brittle key material composition (e.g., plastic) can require a lower density of microperforations at the same thickness to avoid manufacturing flaws and low durability (e.g., cracking of the top surface 300 between perforations). With greater thicknesses, the structural integrity of the keycap 200 can support higher-density arrays of microperforations 308. However, low thicknesses can beneficially correspond to better light penetration, and thus, better definition, sharpness, viewing angles, and readability of the glyphs. In an example embodiment with an aluminum keycap 200, the vertical thickness of the keycap can be about 300 microns, and the diameter of each microperforation 308 can be about 30 microns. See also FIGS. 4, 4A, and 4B and their related descriptions elsewhere herein.

In some embodiments, the array of microperforations can extend substantially from edge to edge across the top surface 300, wherein the microperforations 308 are evenly spaced from edge to edge or from one side 306 to an opposite side 306. In this manner, glyphs created using the microperforations 308 can cover substantially the entire width or length of the top surface 300. In the embodiment shown in FIG. 3B, the array of microperforations 308 lies within a central region 312 that is offset from the outer top edge of the top surface 300 by a perimeter region 314 that surrounds the central region 312 and forms a microperforation-free (i.e., solid) area of the keycap 200. Incorporating a perimeter region 314 can beneficially increase the density of the number of microperforations per inch in the central region 312 due to the perimeter region 314 providing additional structural stability against bending or cracking of the keycap 200 since there are no microperforations in that region. Additionally, a perimeter region 314 can be useful in embodiments where the display or light sources below the keycap 200 do not extend edge to edge underneath the top surface 300, so the central region 312 can effectively only cover and correspond to the light-outputting portions of that display or set of light sources.

Although FIG. 3B shows the microperforations 308 arranged in a square, grid-like array, other embodiments can use different arrangements of microperforations, even in square keycaps. For instance, the microperforations 308 can be arranged in a filled-in circular pattern, a rectangular pattern, a diamond pattern, a logo or icon shape (e.g., an outline of a power button or volume indicator (i.e., a speaker symbol)), or a pattern that imitates the size and shape of one or more glyphs (e.g., an "A"-shape or the shape of multiple letters, symbols, or words (e.g., "SHIFT")). Thus, the square array shown in the figures is for illustration purposes and should not be construed as limiting the manner in which the microperforations 308 can be arranged.

Figure 3C:
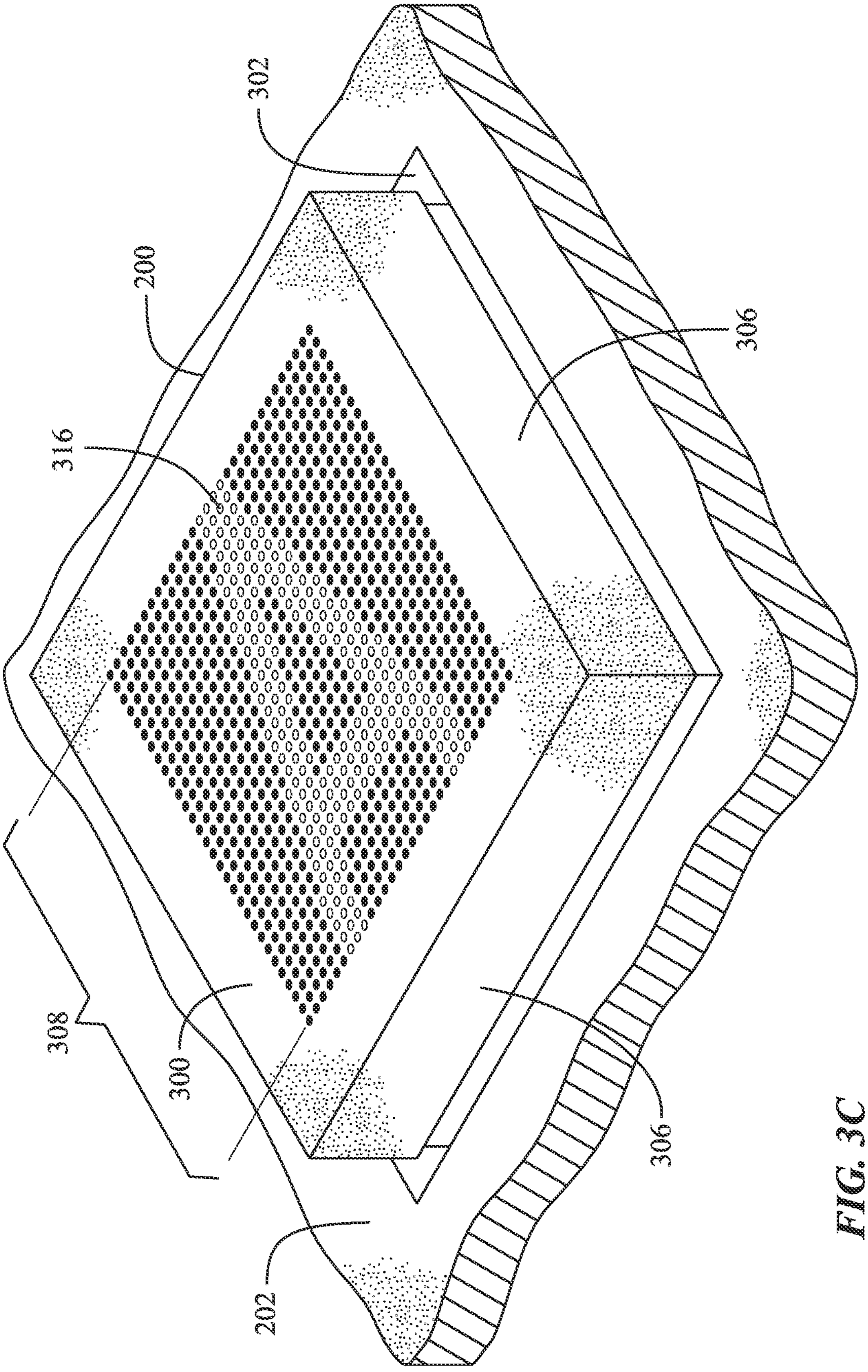
FIG. 3C shows a diagrammatic view of the key mechanism of FIG. 3A in a second condition.

FIG. 3C is another view of the keycap 200 of FIG. 3B wherein the microperforations 308 are partially illuminated from below using the display or by sources under the top surface 300. In this example, a subset of the array of microperforations is illuminated to create a visible "A"-shaped glyph 316. As compared to the configuration shown in FIG. 3B, the configuration shown in FIG. 3C can have the glyphs 316 visible to an unaided human eye due to light being emitted through the subset of microperforations that corresponds to the shape of the glyph 316. In some embodiments, the display or light sources can be configured in such manner that light emitted from one pixel or light source of the display or light sources can be embedded through a single corresponding microperforation 308 at a one-to-one ratio, and each pixel or light source can be prevented from emitting light through adjacent microperforations in a manner that would cause the glyph 316 to appear blurry around the edges. Additionally, in some embodiments, light from the display or light sources can be prevented from passing laterally through the side surfaces 306 or downward underneath the keycap 200, thereby preventing light bleed through the opening 302 surrounding the side surfaces 306 or light bleed between adjacent side surfaces 306 of neighboring keycaps 200.

Figure 3D:
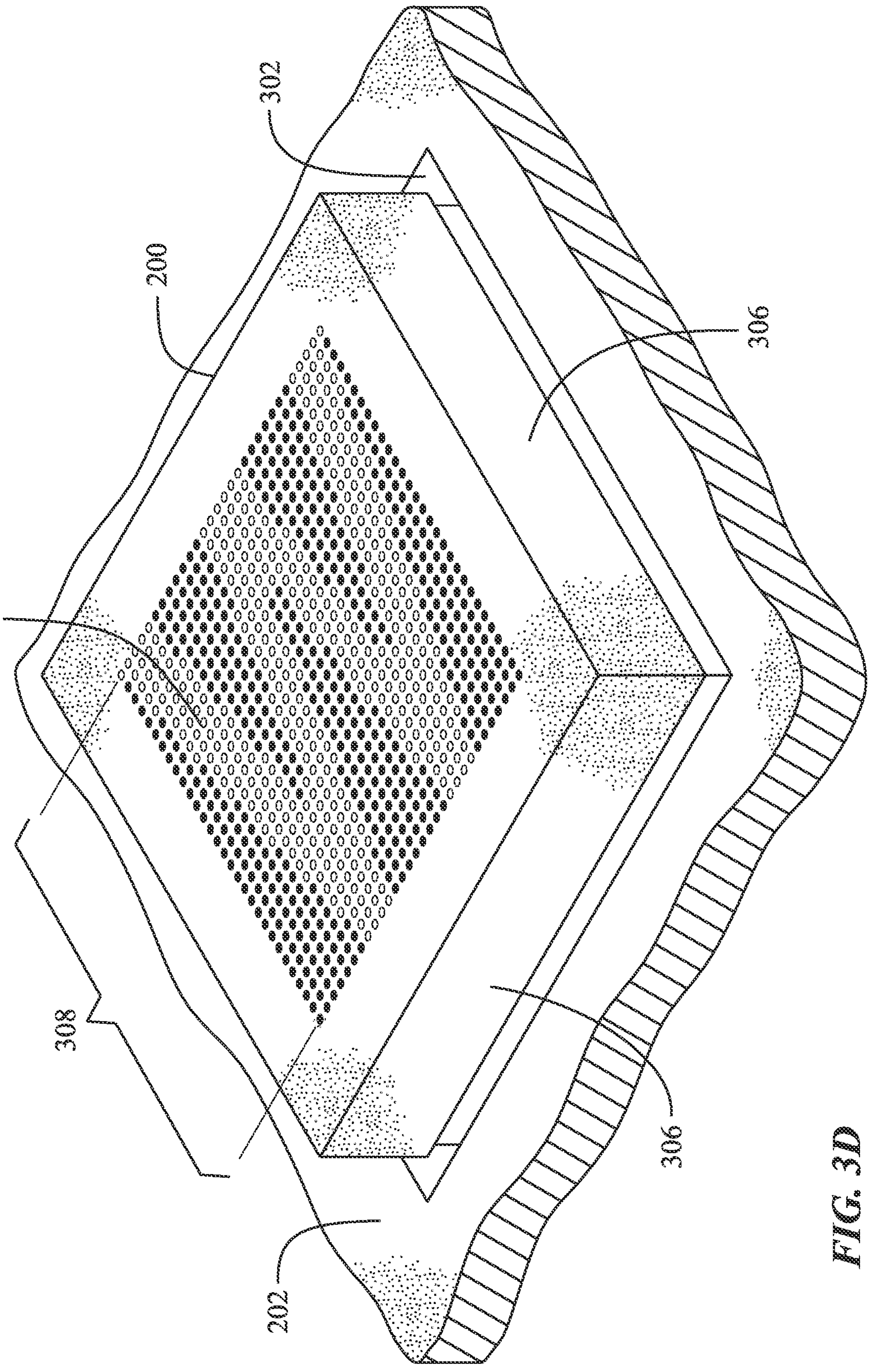
FIG. 3D shows a diagrammatic view of the key mechanism of FIG. 3A in a third condition.

FIG. 3D is an alternative view showing features of an embodiment that can be applied to the embodiments described above in FIGS. 1-3C. In this embodiment, the keycap 200 is configured to change the pattern of light emitted from the display or light sources to show a different glyph 318. In this embodiment, the second glyph 318 has a "W"-shape instead of the "A"-shape of glyph 316. The change in glyph can caused by the display or light sources emitting light from a second set of pixels or light sources that correspond to the positions of the microperforations that form the "W"-shape instead of the ones that form the "A"-shape. In FIGS. 3C and 3D, the square array of microperforations 308 is used to generate both glyphs 316, 318.

In some embodiments, only the perforations needed to form one glyph 316 (the "A"-shape) are included in the keycap 200. In another example, the only perforations provided are those needed to form the glyph 316 in one state of display illumination and second glyph 318 in another state of display illumination. Thus, the number and placement of microperforations 308 can be limited to only the microperforations needed for certain specific letters, symbols, shapes, etc., and any additional microperforations can be omitted.

In some embodiments, the keyboard 110 can include keycaps 200 with glyphs 316, 318 that are changeable from at least a first configuration or appearance to a second configuration or appearance. The first configuration and/or second configuration can display a static glyph with a single shape, size, color, brightness, font, and other appearance characteristics. The static glyph can change at least one of these appearance characteristics when the display or light sources change the glyphs between the first and second configurations. In another example, the first configuration and/or second configuration can display a moving or otherwise changing glyph over time, such as an animation, a series of cycling or changing glyphs, a video, a color-changing sequence, a size-changing sequence, similar changes over time, and combinations thereof. See also FIG. 11.

Furthermore, this glyph customizability can extend to other features of the glyphs 316, 318 besides their overall shapes or symbols presented. The keyboard 110 as a whole can change its glyphs, such as by changing from one keyboard layout (e.g., QWERTY) to another keyboard layout (e.g., Colemak) in response to a user changing a setting for the keyboard and the associated key displays' controller. This can beneficially enable the keyboard 110 to adapt to provide multiple different language settings, typing layouts, and other keyboard functions based on user preferences or programmed commands to the keyboard that are controlled by the keyboard's controller or that are enacted in response to a set of programmed instructions executed by a processor (e.g., a processor of the computing device 100). In this way, a single keyboard apparatus can be constructed and shipped to multiple different computer input device markets, including markets where keyboard layouts or language settings may differ from each other.

Furthermore, the changeable nature of the glyphs 316, 318 can be used to provide user experiences that would be impractical or impossible using a standard, conventional keyboard. For example, in some embodiments, the keyboard 110 can have glyphs (e.g., 316) that are a standard setting, such as a language setting (e.g., an English language keyboard) for typical typing activities, and the keyboard 110 layout and/or glyphs can be modified (e.g., to 318) to provide a keyboard of symbols, images, animations, or shapes that would not be practical in a conventional keyboard, such as a keyboard of emoji shapes and pictures, GIF animations, a simulated set of piano keys, or letters typically only used in ancient languages for which keyboards are not generally used.

In one example embodiment, the set of keycaps 200 can collectively be used as a display, wherein each keycap 200 is configured to display a part of a larger image or a video that is presented spanning multiple keycaps 200. For instance, a region of the keyboard 110 can be used to show a circle, wherein each keycap of a group of keycaps shows a different portion of the circumference, and keycaps within the circumference can be used to show a color of the circle. In another example, the keycaps 200 can collectively be used to show a video (e.g., a flashing light or color-changing sequence), a string of text (e.g., a welcome or warning message), or other data to the viewer (e.g., battery charge status or display brightness level for the computing device, user-defined text, etc.).

Additionally, in some cases glyphs can be modified or customized by a user to correspond to user preferences such as a custom keyboard layout. In an example embodiment, the user can reprogram the "Caps Lock" key to function as a "Ctrl" key or can replace a "Command" key's function with an "Alt" key function, and both of these changes could be accompanied by an appropriate change in glyph to reflect the new functions of the "Caps Lock" and "Command" keys.

Figure 4:
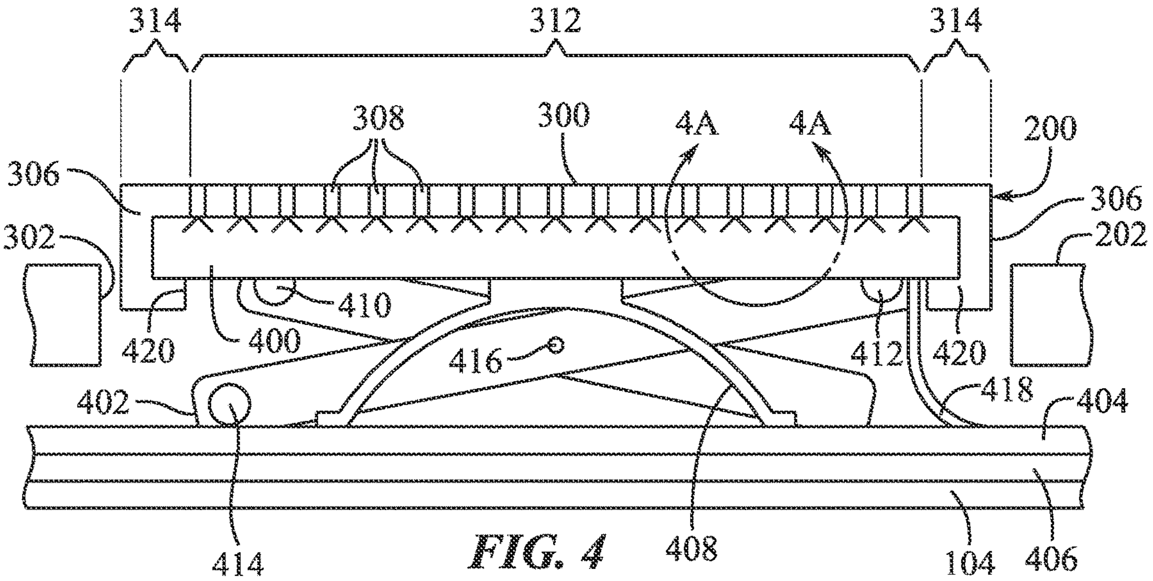
FIG. 4 shows a side section view of the key mechanism of FIG. 3A.

FIG. 4 shows a side section view of a keycap 200 illustrating features of the keyboard 110 that support the keycap 200. The keycap 200 can be positioned on top of a display 400 which is supported by a key stabilizer 402. The key stabilizer 402 can be mounted to a membrane layer 404 or circuit board/substrate layer 406 supported by housing 104. The keycap 200 can have a width less than the width of the opening 302 in the key web 202 so that the keycap 200 can translate vertically and independent of the key web 202 when a force is applied to its top surface 300 pressing it down. In some embodiments, the key web 202 can be mounted to the housing 104 or to the substrate layer 406.

A collapsible dome 408 is positioned between the display 400 and the membrane 404, and can include a resilient material configured to bias the keycap 200 and display 400 upward. The collapsible dome 408 can be configured to apply a biasing force to the keycap 200 to cause the keycap 200 to rise back to the position shown in FIG. 4 after a user releases pressure on a depressed keycap 200. In some embodiments, the collapsible dome 408 can be a switch that, when collapsed, can make an electrical signal indicating that the keycap 200 has been pressed down. For example, the collapsible dome 408 can include a conductive portion configured to make an electrical connection at the membrane 404 when the dome 408 has collapsed into contact with the membrane 404. In some examples, the membrane layer 404 can include multiple layers, such as multiple conductive layers that are collapsed into contact with each other upon collapsing of the collapsible dome 408. Moreover, those having the benefit of the present disclosure will understand how other switches and related keycap position detecting devices used in the art that can be applied to the key mechanisms for the keycaps 200 described herein.

The key stabilizer 402 can provide support to the keycap 200 and display 400 in a manner that helps prevent rotation of the keycap 200 when a downward force is applied off-center on the top surface 300. Thus, the key stabilizer 402 can help the keycap 200 remain parallel to the lower layers 404, 406 as it vertically translates while in use. A key stabilizer 402 can include a scissor mechanism having two crossing hinged parts which are pivotally or flexibly connected to the display 400 or keycap 200 at the top end of the stabilizer 402 and to the substrate 406 or housing 104 at the bottom end of the stabilizer 402. Downward pressure on the keycap 200 can cause rotation of the scissor mechanism hinged parts at pivot connection axes 410, 412, 414, and 416 (and potentially others). Rotation at one of these pivot connection axes can cause movement of the hinged parts of the stabilizer 402 that keeps the keycap 200 from rotating about the pivot axes. For example, a downward force applied to the top surface 300 above axis 412 can induce rotation of the stabilizer 402 at axes 412 and 414, and rotation of the arm of the stabilizer 402 can pull down the other, crossing arm of the stabilizer 402, thereby inducing rotation at axes 410 and 416. The key stabilizer 402 can include a central opening that receives the collapsible dome 408 so that the arms of the stabilizer 402 can move around the dome 408 without causing the dome to collapse due to contact with the stabilizer 402.

The keycap 200 can be attached to and positioned on top of a display 400, or a set of light sources that includes an array of light sources (e.g., pixels) that correspond to some or all of the microperforations 308 extending through the keycap 200. As shown in FIG. 4, the display 400 can have a width extending across the central region 312 and having its light sources extending across substantially the entire width of central region 312. The display 400 can have an electrical connection to the substrate 406 via a flexible connector 418 that extends from one side of the bottom surface of the display 400 to the substrate 406 below. The flexible connector 418 can include conductors, wiring, etc. to allow power and control signals to be provided to the display 400 for power and control of the light sources in the display 400. Upon movement of the keycap 200 downward, the flexible connector 418 can bend, flex, and/or compress to accommodate the keycap's movement while maintaining electrical communication with the substrate 406. The flexible connector 418 can beneficially extend from an edge or bottom surface near the outer perimeter of the display 400 in a manner that avoids mechanical interference with movement of the stabilizer 402 or collapsible dome 408, thereby improving the durability and longevity of the flexible connector 418.

The keycap 200 can also include sidewalls 306 that extend laterally around the display 400 and that block any stray laterally-projected light from the display 400 from escaping the sides of the keycap 200 and being visible by a user. The sidewalls 306 can also protect and cover the sides of the display 400 for improved aesthetics (e.g., matching the appearance of the key web 202) and prevention of intrusion of contaminants or damage to the display 400. The inner surfaces of the sidewalls 306 can include one or more ridges or protrusions 420 configured to provide support to the display 400 and to help retain the display 400 within the keycap 200. The ridges or protrusions 420 can form a shelf-like surface undergirding the display 400 and reinforcing an adhesive or other attachment devices used to keep the display 400 securely positioned against the bottom surface of the keycap 200.

Figure 4A:
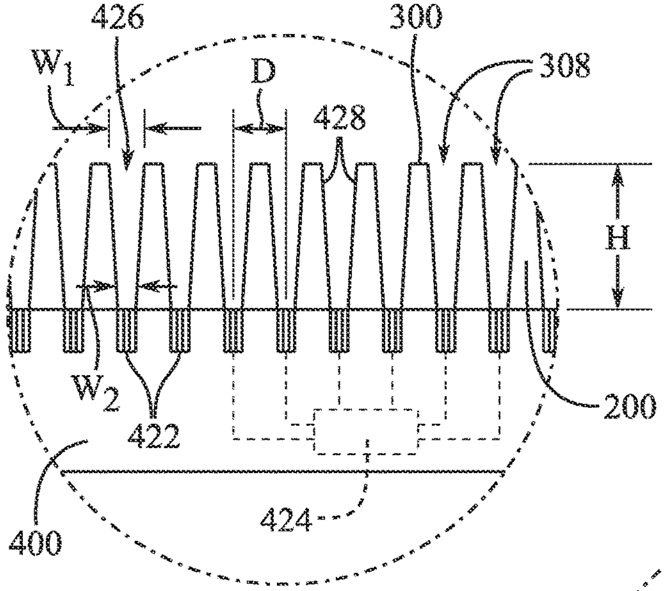
FIG. 4A shows a detail view of the key mechanism of FIG. 4.

FIG. 4A schematically represents a detail view of the keycap 200 and display 400 at a microscopic level that shows a side-view cross-section of the microperforations 308 and their positioning above the display 400. The number and size of the perforations and light sources shown in FIGS. 4 and 4A are not to scale, and are schematically shown for aid in understanding the devices of the present disclosure. The display 400 shows the array of light sources 422 with each light source 422 positioned at the bottom opening of each microperforation 308. Accordingly, each light source 422 can individually emit light upward through the microperforation 308 aligned with it, thereby illuminating a single microperforation at a time. This configuration allows fine control of the appearance of the keycap 200 by enabling precise illumination of selected microperforations in the array of microperforations according to control of the illumination of the individual light sources 422. Furthermore, as shown in FIG. 4A, the light sources 422 can have their top ends substantially abutting or positioned directly under each microperforation 308 in a manner that prevents light emitted from a light source 422 from scattering into an adjacent microperforation 308, thereby preventing edge fuzziness or other lack of clarity of the glyphs generated by the display 400.

The light sources 422 can include semiconductor light sources or other solid-state lighting devices. For example, some suitable light sources include, but are not necessarily limited to, light-emitting diodes (e.g., LEDs or micro-LEDs) (e.g., in single and/or multiple colors), organic light emitting diodes (OLEDs), polymer light emitting diodes (PLEDs), electroluminescent (EL) strips, similar devices, and combinations thereof. A given light source 422 can be configured to produce one or more colors, intensities, patterns, etc. of light of any desired spectral range (e.g., visible, infrared, ultraviolet, etc.), as desired for a given target application or end-use. Other suitable light engine types, configurations, and emission spectra for a given light source 422 will depend on a given application and will be apparent in view of the present disclosure.

The light sources 422 in FIG. 4A are illustrated as a set of red-green-blue (RGB)-emitting pixels, wherein one of each color channel is capable of emitting its color into one microperforation 308, so that each microperforation 308 can have red, green, and blue light emitted through it with various levels brightness for each. Thus, the display 400 can be controlled to emit a large range of hues, saturations, and brightnesses from the light sources 422. In some embodiments, the display 400 can include light sources 422 that have binary light emitting properties (e.g., just on or off) or that only emit one or two colors (e.g., white, blue, red, blue and red, etc.). The width of each light source 422 can be less than, or about equal to, the width of the microperforation 308 nearest to the light source 422. In this manner, light from the light sources 422 can be efficiently emitted through the microperforation 308 instead of being absorbed or otherwise wasted below the keycap 200, thereby improving brightness and color accuracy of the display 400.

The display 400 can include an onboard display controller 424 in electrical communication with some or all of the light sources 422 in the display 400. A display controller 424 is shown schematically in FIG. 4A in electrical communication with a portion of the light sources 422. The display controller 424 can control the output characteristics of the light sources 422 to which it is connected by controlling the provision of power to each light-emitting portion of the light sources 422 so that chosen color properties are emitted from the light sources 422 and so that the proper light sources 422 are enabled to create the glyph for the keycap 200. The display controller 424 can be part of, or connected to, an output device adapter 1020 (see FIG.

FIG. 4A also illustrates how a microperforation (e.g., example microperforation 426) can have a tapered diameter and frusto-conical profile. This shape can be formed by creating the microperforation 426 using laser engraving techniques and similar irradiating ablation operations. As such, the microperforation 426 can have a greater width $W_1$ at its top, outer end as compared to a smaller width $W_2$ at its lower, inner end. The height H (i.e., depth) of the microperforation 426 can extend through the entire thickness of the keycap 200 between the top surface 300 and the surface facing the top of display 400. In some embodiments, the outer width $W_1$ can be less than or equal to about 75 microns, and the inner width $W_2$ can be equal to about microns. The height H can be determined based on the material properties of the keycap 200, wherein the height H can correspond to the minimum thickness of the keycap 200 that preserves the durability, bending strength, and other physical characteristics needed for the keycap 200 to retain its structure and appearance over long periods of use. In an example embodiment, the microperforation 426 can have a width $W_1$ of about 90 micrometers, a width $W_2$ of about 30 micrometers, and a height H of about 300 micrometers with an aluminum keycap material. The dimensions shown in the figures are not to scale.

Minimizing the height H of the microperforations 308 can improve the perceived maximum brightness, clarity, viewing angles, and sharpness of the glyphs due to minimizing the amount of material covering and interfering with the light sources 422. Additionally, in an example embodiment, the distance D between the centers of adjacent microperforations 308 can be in a range of about 0.15 millimeters to about 0.25 millimeters, or in one embodiment about millimeters, thereby also helping to preserve the structural properties of the keycap 200 and the imperceptibility of the microperforations 308 while also keeping the array of perforations dense enough to make discernment of individual backlighted perforations difficult or impossible to an unaided human eye.

The microperforations 308 can have sloped sidewalls 428 that vertically taper down from the outer width $W_1$ to the inner width $W_2$. In some embodiments, these sidewalls can be designed with improved reflectivity as compared to the top surface 300 or other surfaces of the keycap 200. For example, a coating or reflective treatment can be added to the sloped sidewalls to improve the efficiency of the light sources 422 and to maximize the amount of light that escapes each perforation. In another example, the surfaces of the sloped sidewalls can be laser-treated to refine their surface finish to improve their reflectivity. Highly reflective sloped sidewalls can also improve viewing angles of the glyphs so that they are visible from lower angles relative to a vertical axis extending through each perforation as compared to embodiments where the sloped sidewalls are less reflective. When a coating or other reflective additive is applied to the microperforations, the microperforations can be initially formed have a greater than usual widths $W_1$, $W_2$ so that the final dimensions of each perforation width $W_1$, $W_2$ (after coating or other covering buildup) end up within proper specifications for light transmission (as described above).

Similarly, in some embodiments the keycap 200 can be anodized. An anodization layer can add about 10 microns of thickness to the surfaces of the keycap 200 to which it is added. Accordingly, the keycap 200 can be designed with microperforations 308 that are about microns greater in width at widths $W_1$ and $W_2$ so that the added thickness of the anodization layer (on each side of the microperforation) does not cause the perforations to become too narrow to perform their intended functions. Furthermore, in some embodiments, the keycap 200 can be anodized before the microperforations 308 are added. In that example, the microperforations 308 can be formed with their final dimensions since no added material will be coated or will be otherwise added to the sloped sidewalls. In other words, the microperforations can be cut to their expected final tolerances by the laser, rather than being enlarged to accommodate a coating or anodization layer.

Figure 4B:
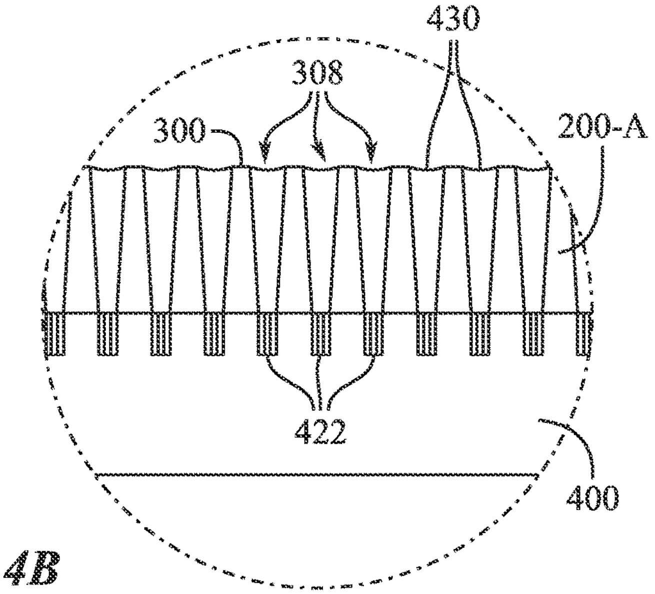
FIG. 4B shows a detail view of an alternate embodiment of the key mechanism of FIG. 4.

FIG. 4B shows an alternative embodiment side section view with the keycap 200-A having its array of microperforations 308 at least partially filled by a filler material 430. In this embodiment, the filler material 430 is an ultraviolet (UV) glue configured to be applied to the empty microperforations 308 as a liquid and then cured in place (polymerized) by UV light irradiation. The filler material 430 can alternatively include other liquid adhesives, mediums, resins, etc. that will be apparent to those having skill in the art and the benefit of the present disclosure. The filler material 430 can be transparent to allow maximum light emission through the microperforations 308. In some embodiments, the filler material 430 can be translucent/partially opaque to help diffuse the light and to improve the range of viewing angles of the illuminated glyphs. Thus, the filler material 430 can be referred to as a diffuser material or a light diffuser positioned within the array of microperforations.

The filler material 430 can have a top surface that is recessed below the top surface 300 of the keycap 200 due to surface tension or due to formation of a meniscus at the top surface of the filler material 430. The meniscus can be concave, as shown in FIG. 4B, or convex, depending on the material used for the filler. The top surface of the filler material 430 can be close to the top surface 300 of the keycap 200 to help minimize the visibility of the microperforations 308 and to ensure maximum reinforcement to the keycap 200.

In some embodiments, inclusion of the filler material 430 can improve the structural rigidity of the keycap 200-A at the microperforations 308, thereby improving its durability and enabling the keycap 200-A to be thinner (e.g., as compared to keycap 200 in FIG. 4A). The filler material 430 can also serve as a barrier to debris, liquid, dust, finger oils, and other potential contaminants that could block light coming from the light sources 422 by occluding or filling a microperforation 308. Accordingly, the appearance of the array of microperforations 308 can function more consistently over a long period of time and even after being exposed to contaminants because those contaminants cannot penetrate into the microperforations.

Figure 5:
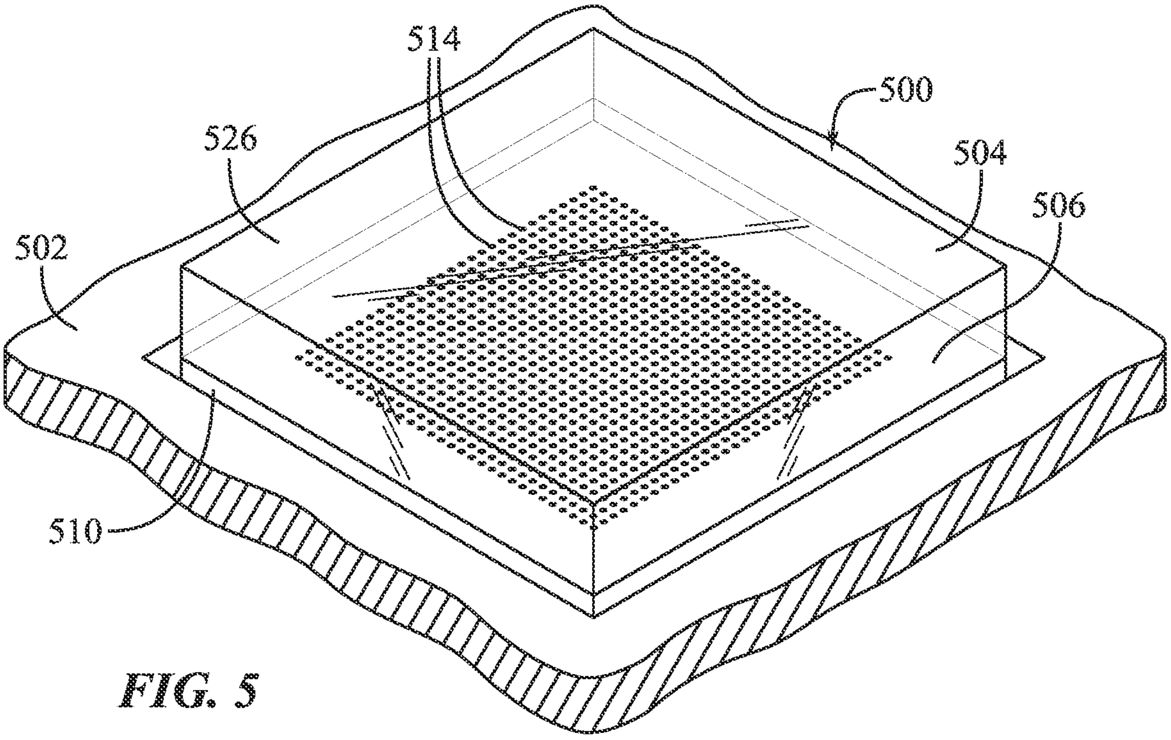
FIG. 5 shows a perspective view of a key mechanism.
Figure 6:
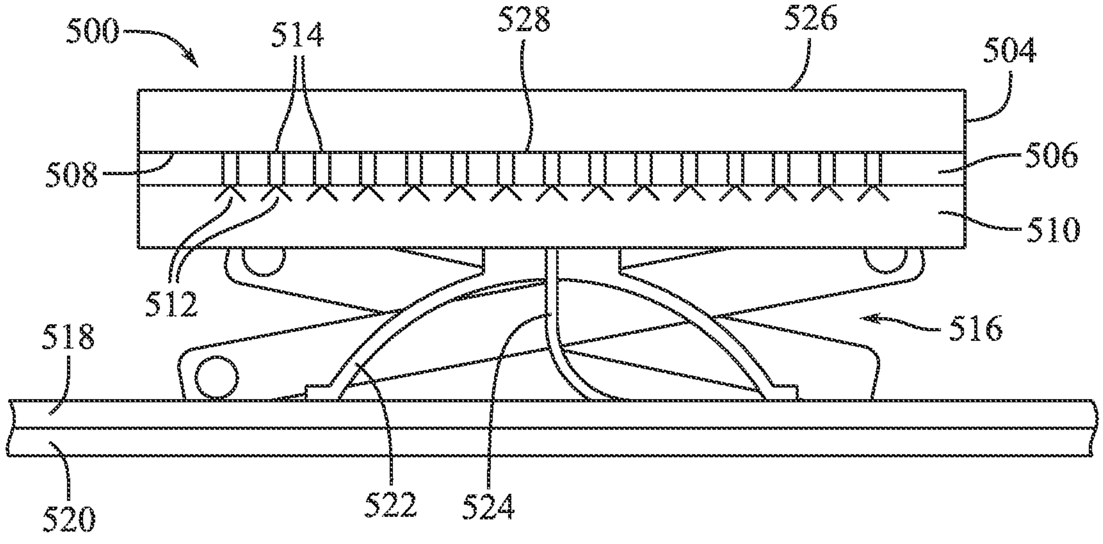
FIG. 6 shows a side section view of the key mechanism of FIG. 5.

FIG. 5 is an orthographic view of a keycap 500 positioned in a rigid web 502 and shown separate from other keycaps and key mechanisms of a keyboard (e.g., 110). Features of the keycap 500 can be incorporated into other embodiments shown elsewhere herein. FIG. 6 shows a side section view of the keycap 500 and associated parts. The keycap 500 includes an upper body 504 with an opaque layer 506 attached to the bottom surface 508 of the upper body 504. A display 510 is attached to the keycap below the opaque layer 506 and is configured with a plurality of light sources 512 oriented to vertically upward through an array of microperforations 514 in the opaque layer 506 and through the upper body 504. The bottom of the display 510 can be mounted to a key stabilizer 516 having pivoting arms, wings, or similar structures, as described in connection with FIG. 4. A membrane 518 and a substrate 520 can be positioned below the keycap 500 as well, similar to FIG. 4. A dome 522 can also be similarly configured as in the embodiment of FIG. 4.

In some examples, a flexible connector 524 can extend from a central area of the display 510 and connect to the substrate 520 through the dome 522. In this example, the flexible connector 524 can extend through the dome 522, or can extend downward from the display 510 from a positioned adjacent to and lateral to the dome 522. Positioning the flexible connector 524 through or next to the dome 522 at the central portion of the display 510 can help avoid contact between the flexible connector 524 and the key stabilizer 516, thereby proving the durability and reliability of the flexible connector 524. Alternatively, the flexible connector 524 can extend from the peripheral area of the display 510 into electrical communication with the substrate 520, as in the embodiment of FIG. 4.

As shown in FIG. 5, the opaque layer 506 can be visible through a top surface 526 of the upper body 504. The upper body 504 can include a substantially transparent material such as glass, transparent ceramic, transparent polymer, crystal, similar materials, and combinations thereof. The top surface 526 of the upper body 504 can be a contact surface for engaging a user instrument (e.g., finger) when pressing on the keycap 500 and can transfer the force of the instrument to the parts and mechanisms below it.

The opaque layer 506 can include a material applied to, or formed on, the bottom surface 508. The opaque layer 506 can appear opaque when viewed from above and through its top surface 528 to obscure the appearance of the display 510 below. The opaque layer 506 can include a paint layer, a metallic coating, a metal or plastic sheet or plate, or similar opaque material on the bottom surface 508 and through which the array of microperforations 514 can be formed. In some examples, the upper body 504 can beneficially include a material that is a more scratch resistant material as compared to the opaque layer 506, such as with the upper body 504 having higher hardness than the hardness of the opaque layer material. The upper body 504 can protect the material of the opaque layer 506 which would otherwise be more prone to scratches, staining, and other types of wear and damage that the opaque layer 506 would be susceptible to in the absence of a protective upper body 504. In an example embodiment, the upper body 504 can include a glass material and the opaque layer 506 can include a paint, polymer, or resin material applied to the glass material, wherein the paint, polymer, or resin material is protected from scratches and exposure to surface rubbing, scraping, or chemical marring or staining by the glass material due to the glass material acting as a shield or buffer between the top surface of the keycap and the top surface of the opaque layer 506.

In some embodiments, the opaque layer 506 can include a sheet of material that is the same material used in the rigid web 502 or other chassis portion surrounding the keyboard, thereby giving the appearance of the keycaps 500 the same hue, saturation, brightness, texture, and other appearance characteristics as the top surface surrounding the keycap 500. In some embodiments, the keyboard chassis or housing can include a transparent material having an appearance similar to the upper body 504 that overlays a lower layer similar to opaque layer 506. For example, the chassis surrounding the keycap 500 can have a glass top layer and a paint or metal secondary layer directly below the glass top layer. In some embodiments, the keyboard chassis can include the same material as the opaque layer 506, so the opaque layer 506 can match the appearance characteristics of the chassis, and the upper body 504 can be overlaid on the opaque layer 506, thereby granting the appearance of a transparent or translucent structure floating on or above the chassis and opaque layer 506.

In some embodiments, the opaque layer 506 can include attachment structures for joining the display 510 and/or stabilizer 516 to the opaque layer 506. For example, the opaque layer 506 can include brackets that extend around or through the display 510 to connect to the stabilizer 516 or components (e.g., similar to protrusions 420 and their related embodiments described above) to secure the display 510 to the opaque layer 506.

The array of microperforations 514 can be formed in or cut through the opaque layer 506 in a manner similar to other manufacturing methods described herein (e.g., laser cutting/ablation). The microperforations 514 can have properties similar to other microperforations described above, such as by being invisible to an unaided human eye, being arranged in a grid or square array, extending completely through the opaque layer 506, etc. Accordingly, the opaque layer 506 can have a uniform, non-perforated appearance through the upper body 504 despite being perforated by tens, hundreds, or thousands of microperforations 514. Furthermore, in some embodiments, such as when the opaque layer 506 is a coating, paint, thin film, PVD layer, or similar sub-millimeter-thickness structure, the thickness of the opaque layer 506 can be less than in embodiments where the top of the keycap (e.g., 200) includes a structural metal body, so the opaque layer 506 can be minimally thick, and the microperforations 514 can have a minimized depth as well. As a result, light from the display 510 can more easily and more completely pass through the opaque layer 506, thereby improving visibility, readability, viewing angles, visible edge sharpness, and related properties of a glyph produced by the display 510.

The display 510 can include similar properties to the display 400, with an array of light sources 512 arranged to align with, and provide light to, an equal number of microperforations 514 through the opaque layer 506. Accordingly, the display 510 can be visible through and above the opaque layer 506. The light sources 512 in the display 510 are shown diagrammatically in FIG. 6 to indicate that they are configured direct light upward (i.e., along the direction of the upward-pointing arrows).

Figure 7:
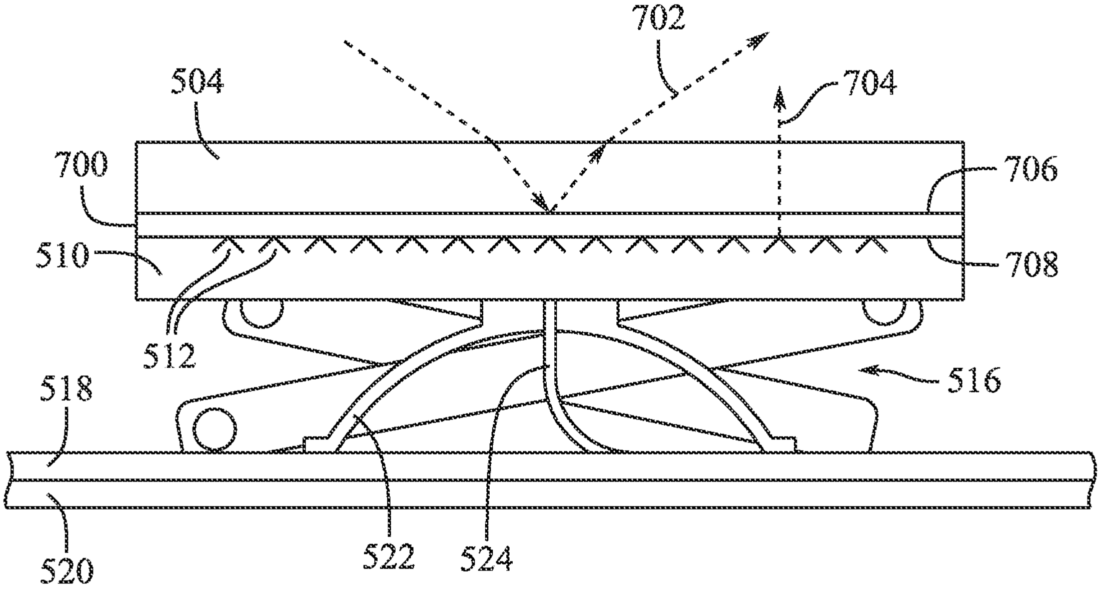
FIG. 7 shows a side section view of an additional embodiment a key mechanism.

FIG. 7 shows an embodiment having an intermediate layer 700 including an at least partially reflective or mirrored surface. The intermediate layer 700 can reflect light 702 incident from above the intermediate layer 700 (i.e., through the upper body 504) while also permitting direct or refractive passage of light 704 through the intermediate layer 700 from light sources of the display 510 positioned directly under the intermediate layer 700. The reflection of light 702 at the top surface 706 (or, in some embodiments, at the bottom surface 708) of the intermediate layer 700 can be specular. For example, the intermediate layer 700 can include a PVD layer or other mirrored film that lacks microperforations. The light 704 passing through the intermediate layer 700 can sharply and accurately show the glyph generated by the display 510 without passing through microperforations. This configuration can be referred to as a one-way reflective or one-way mirror configuration. Alternatively, reflection of light 702 at the intermediate layer 700 can be diffuse or non-specular, and the glyph generated by light 704 from the display 510 can appear partially blurry or diffuse, but still readable by a user. In this example, the configuration can be referred to as a diffuse or non-specular one-way reflective layer. Structures and features of intermediate layer 700 can be implemented in other embodiments shown and described herein, such as in an opaque layer 506 having an at least partially reflective or mirrored top or side surface.

In various embodiments, the intermediate layer 700 can be formed with or without a set of microperforations. Thus, the material of the intermediate layer 700 can be at least partially transmissive of light (e.g., 704) as compared to other fully opaque materials used in opaque layers described herein (e.g., 200, 506). Using an at least one-way light-transmissive intermediate layer 700 can simplify manufacturing and can impart a unique appearance to the keycap at the bottom of the upper body 504. The appearance of the keycap can change upon activation of the display 510 and its generation of a visible glyph through the intermediate layer 700. The appearance of the intermediate layer 700 can be configured to match the appearance characteristics of the upper surface of the housing surrounding the key or keyboard. Thus, the presence of the display 510 can be hidden from view until the light sources 512 are activated, and each of the keycaps can have a uniform appearance that lacks any symbols or glyphs until the display 510 is activated.

An embodiment using a partially transparent or one-way reflective intermediate layer 700 can beneficially be used with displays 510 having high light source density (i.e., higher pixel resolution) within a given keycap area. When the intermediate layer 700 is not required to include an array of microperforations, the number of light sources and their positioning can be arranged at the highest density possible for the display 510 without regard to whether the number of microperforations in a layer above the display 510 will match the number of light sources. Additionally, when an upper body 504 is used with a layer formed on its bottom surface (e.g., 506 or 700), the number of microperforations added to the layer on that bottom surface can be higher in density within a given area as compared to an embodiment where the entire keycap has microperforations through its top surface to the display, such as the embodiment shown in FIG. 4. This difference in features is possible because the layer formed under the upper body 504 is not required to operate as a structural portion of the keycap, whereas a keycap having microperforations through its thickness, such as in the embodiment of FIG. 4, can support a limited number of microperforations before becoming too structurally unsound to function as a keycap structure.

Figure 8:
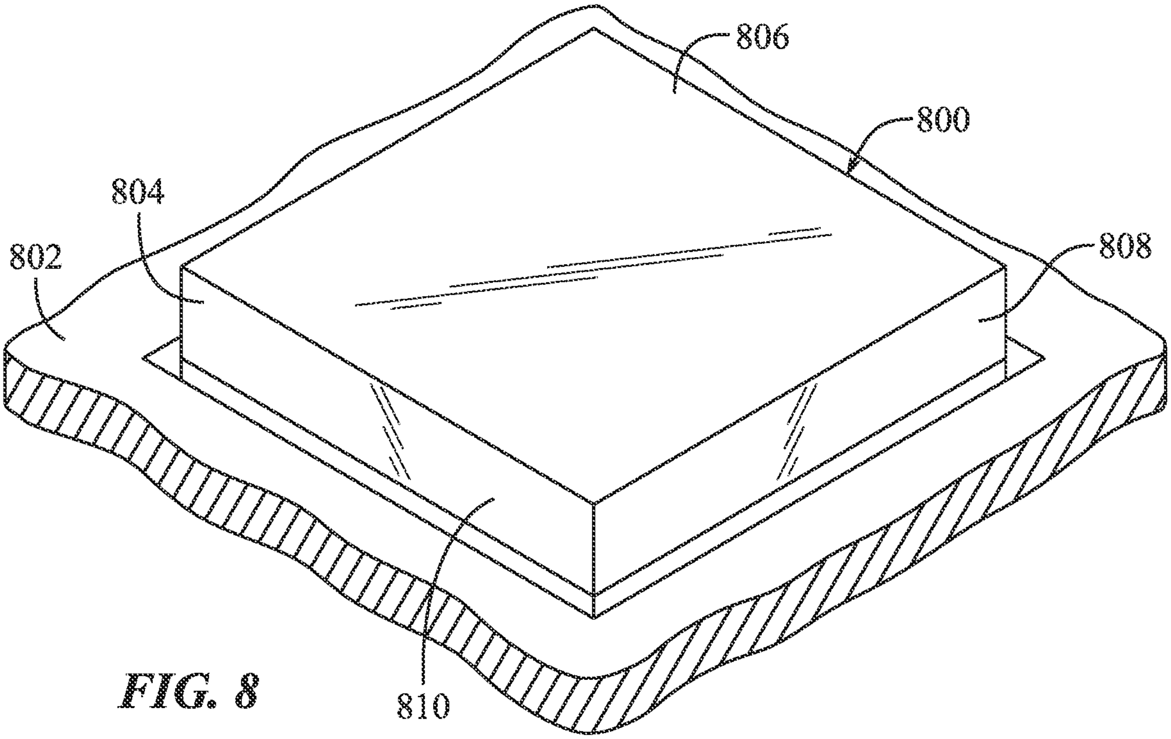
FIG. 8 shows a perspective view of a key mechanism.

FIG. 8 illustrates an embodiment wherein the keycap 800 fits within a key web 802 with an upper body 804 having a top surface 806 and side surfaces 808, 810. Structures and features of keycap 800 can be implemented in other embodiments shown and described herein (and vice versa). The upper body 804 can be at least partially light-transmissive, and at least one of the top and side surfaces 806, 808, 810 can have one-way reflective or partially transmissive properties. These surfaces can be referred to as one-way visibility layers, wherein a device underneath the layer (e.g., a display 510) is not visible when light shines on one side of the layer (e.g., the top surface), but the device under the layer is visible when light shines through the opposite side of the layer (e.g., through the bottom surface, such as when light is emitted by the display). Various structures disclosed herein can be referred to as one-way visibility layers, such as keycaps with an array of microperforations, keycaps with an array of microperforations in an intermediate or bottom layer or coating below an upper body, or keycaps with a one-way reflective layer or structure positioned on a surface thereof.

As compared to the embodiment of FIG. 7, the keycap 800 can have at least one outer surface with a specularly reflective appearance and materials similar to the intermediate layer 700, especially while an underlying display is not emitting light. When one or more outer surfaces of the upper body 804 have this property, the keycap 800 can have an outward appearance of being entirely mirrored or reflective and can conceal a display and a transparent nature of the interior or lower portion of the upper body 804. Thus, the keycap 800 can include a transparent or translucent material within its outer surfaces such that the transparent properties of the keycap 800 are hidden by the reflective outer surface properties. When light is emitted from below the upper body 804, such as from a display contacting the bottom surface or positioned immediately adjacent to the upper body 804 and movable with the upper body 804, the light can pass through the one-way reflective surfaces of the upper body 804 so that the light from the display can be viewed through the top surface of the keycap 800.

Figure 9:
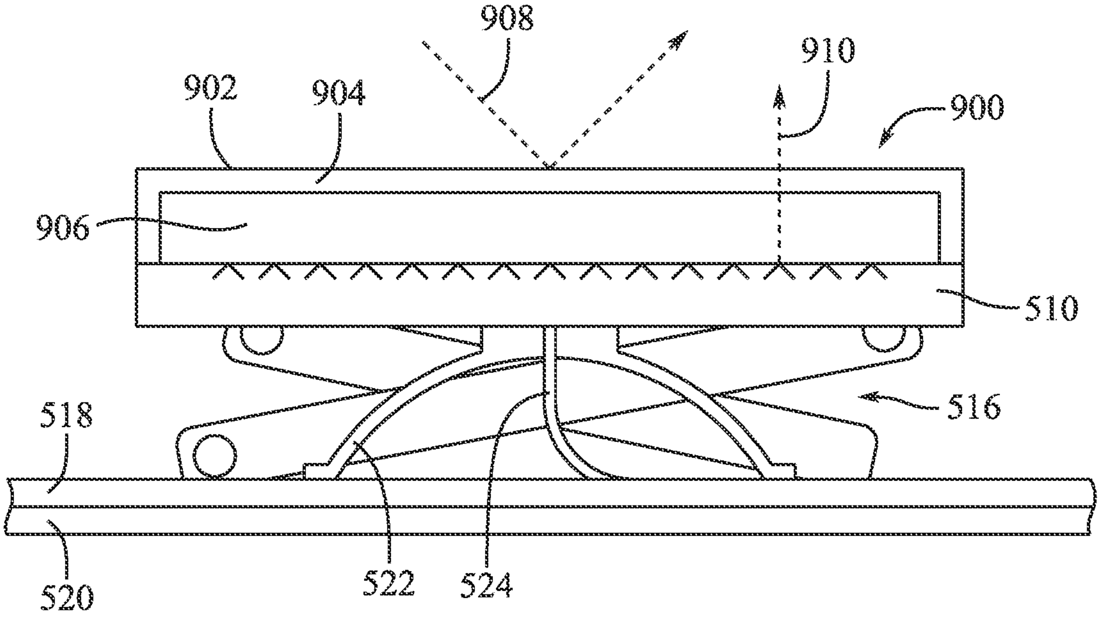
FIG. 9 shows a side section view of a key mechanism.

For example, as shown in the diagrammatic side section view of FIG. 9, a keycap 900 can have a top surface 902 with a one-way mirrored coating 904 (or other deposited or applied layer) on the top and/or sides of a transparent body 906. Keycap 900 is therefore an example embodiment of keycap 800. Structures and features of keycap 900 can be implemented in keycap 800 and other embodiments shown and described herein. Thus, substantially all incident light 908 from above or to the sides of the keycap 900 reflects from the top surface 902 or side surfaces at the coating 904. However, light 910 from the display 510 (e.g., glyphs or other displayed images, as discussed in detail above) under the transparent body 906 can pass through the body 906 and through the coating 904 so that it is visible above the keycap 900. Accordingly, the presence of the display 510 and the transparency of the body 906 can both be masked by the coating 904. This can give the keycap 900 uniform appearance characteristics at the top and side surfaces and can also make the keycap 900 match the appearance of mirrored surfaces surrounding the keycap 900. Furthermore, as with the embodiment of FIG. 7, the display 510 in FIG. 9 can have light sources with a positioning and density not limited by or corresponding to a number of microperforations in the keycap 900, thereby allowing the display light to potentially be sharper and brighter when viewed through the keycap 900.

Figure 10:
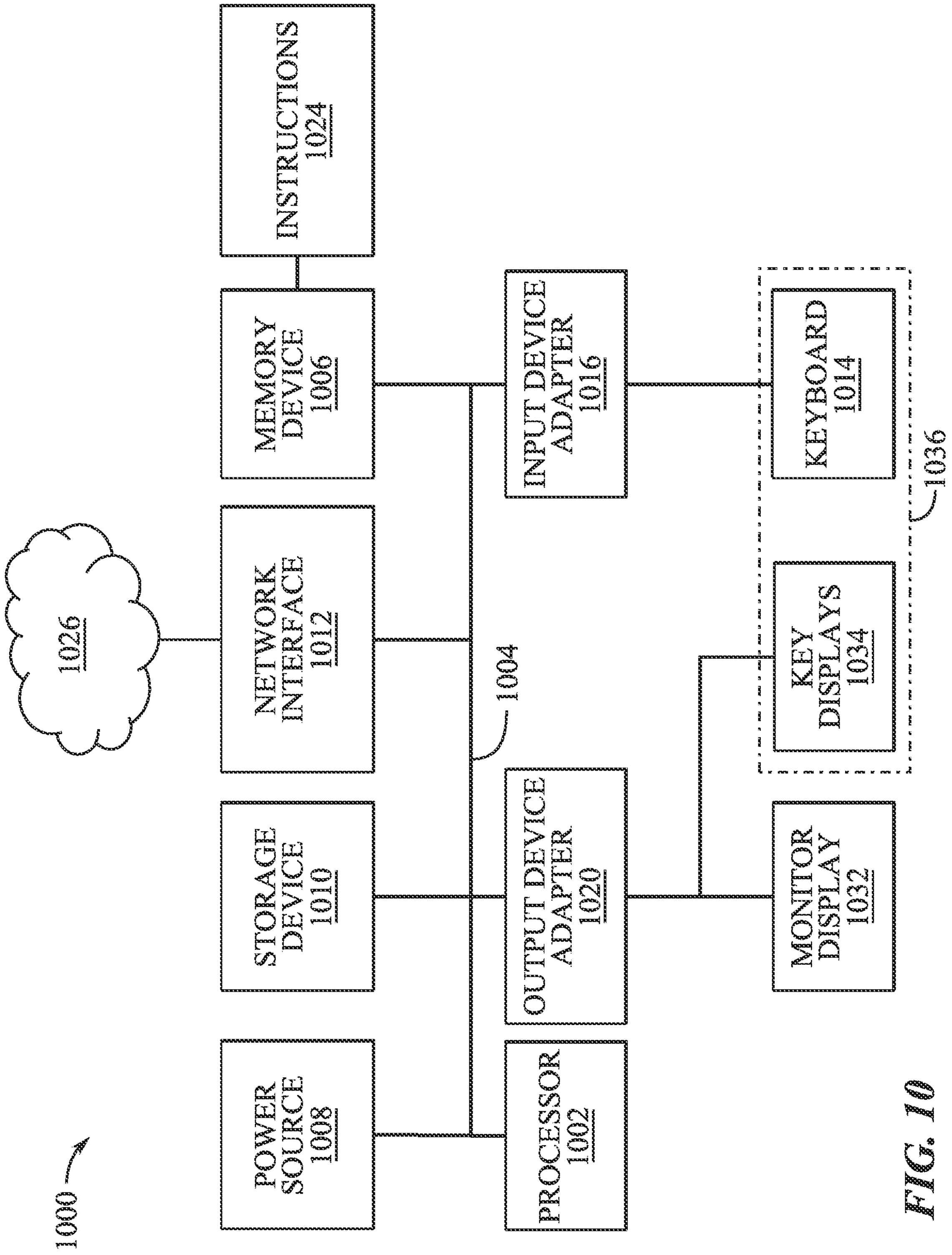
FIG. 10 shows a computer system of the present disclosure.

FIG. 10 shows a block diagram of a computer system 1000 for embodiments of the present disclosure. In various embodiments, the computer system 1000 can include various sets and subsets of the components shown in FIG. 10. Thus, FIG. 10 shows a variety of components that can be included in various combinations and subsets based on the operations and functions performed by the system 1000 in different embodiments. For example, the computer system 1000 can be part of the computing device 100 described above in connection with FIG. 1 or other keyboards, key mechanisms, and display devices described herein. It is noted that, when described or recited herein, the use of the articles such as "a" or "an" is not considered to be limiting to only one, but instead is intended to mean one or more unless otherwise specifically noted herein.

The computer system 1000 can include a central processing unit (CPU) or processor 1002 connected via a bus 1004 for electrical communication to a computer memory device 1006, a power source 1008, an electronic storage device 1010, a network interface 1012, an input device adapter 1016, and an output device adapter 1020. For example, one or more of these components can be connected to each other via a substrate (e.g., a printed circuit board or other substrate such as substrates 406 and 520) supporting the bus 1004 and other electrical connectors providing electrical communication between the components. The bus 1004 can include a communication mechanism for communicating information between parts of the system 1000.

The processor 1002 can be a microprocessor or similar device configured to receive and execute a set of instructions 1024 stored by the memory 1006. The memory 1006 can be referred to as main memory, such as random access memory (RAM) or another dynamic electronic storage device for storing information and instructions to be executed by the processor 1002. The memory 1006 can also be used for storing temporary variables or other intermediate information during execution of instructions executed by the processor 1002. The storage device 1010 can include read-only memory (ROM) or another type of static storage device coupled to the bus 1004 for storing static or long-term (i.e., non-dynamic) information and instructions for the processor 1002. For example, the storage device 1010 can include a magnetic or optical disk (e.g., hard disk drive (HDD)), solid state memory (e.g., a solid state disk (SSD)), or a comparable device. The power source 1008 can include a power supply capable of providing power to the processor 1002 and other components connected to the bus 1004, such as a connection to an electrical utility grid or a battery system.

The instructions 1024 can include information for executing processes and methods using components of the system 1000. Such processes and methods can include, for example, the methods described elsewhere herein, including, for example, the method described in connection with FIG. 11.

The network interface 1012 can include an adapter for connecting the system 1000 to an external device via a wired or wireless connection. For example, the network interface 1012 can provide a connection to a computer network 1026 such as a cellular network, the Internet, a local area network (LAN), a separate device capable of wireless communication with the network interface 1012, other external devices or network locations, and combinations thereof. In one example embodiment, the network interface 1012 is a wireless networking adapter configured to connect via WI-FI®, BLUETOOTH®, BLE, Bluetooth mesh, or a related wireless communications protocol to another device having interface capability using the same protocol. In some embodiments, a network device or set of network devices in the network 1026 can be considered part of the system 1000. In some cases, a network device can be considered connected to, but not a part of, the system 1000.

The input device adapter 1016 can be configured to provide the system 1000 with connectivity to various input devices such as, for example, a keyboard 1014 and various switches (e.g., collapsible domes or mechanical switches) or key mechanisms that receive input via a user pressing on the keyboard. The keyboard 1014 or another input device (e.g., buttons or switches) can be used to provide user input such as input regarding the settings of the system 1000. The input device adapter 1016 and/or keyboard 1014 can include a keyboard controller configured to receive electrical signals from the switches or sensors of the keyboard and to provide those signals to the processor 1002 for processing, interpretation, and action.

The output device adapter 1020 can be configured to provide the system 1000 with the ability to output information to a user, such as by providing visual output using one or more monitor displays 1032 or key displays 1034. Other output devices can also be used. The processor 1002 can be configured to control the output device adapter 1020 to provide information to a user via the output devices connected to the adapter 1020. For example, the monitor display 1032 can be controlled to output a user interface, application windows, and similar information, and the key displays 1034 can be controlled to show glyphs, images, symbols, shapes, or no output, as described in detail elsewhere herein. Individual key displays 1034 can be controlled, such as by adjusting or changing the information presented by one key, or the key displays 1034 as a whole can be controlled, such as by adjusting or changing the layout or symbols of multiple keys of the keyboard, showing animations that appear to move from one key display to another or that collectively form a composite display using multiple keys to display an image, shape, animation, etc.

Figure 11:
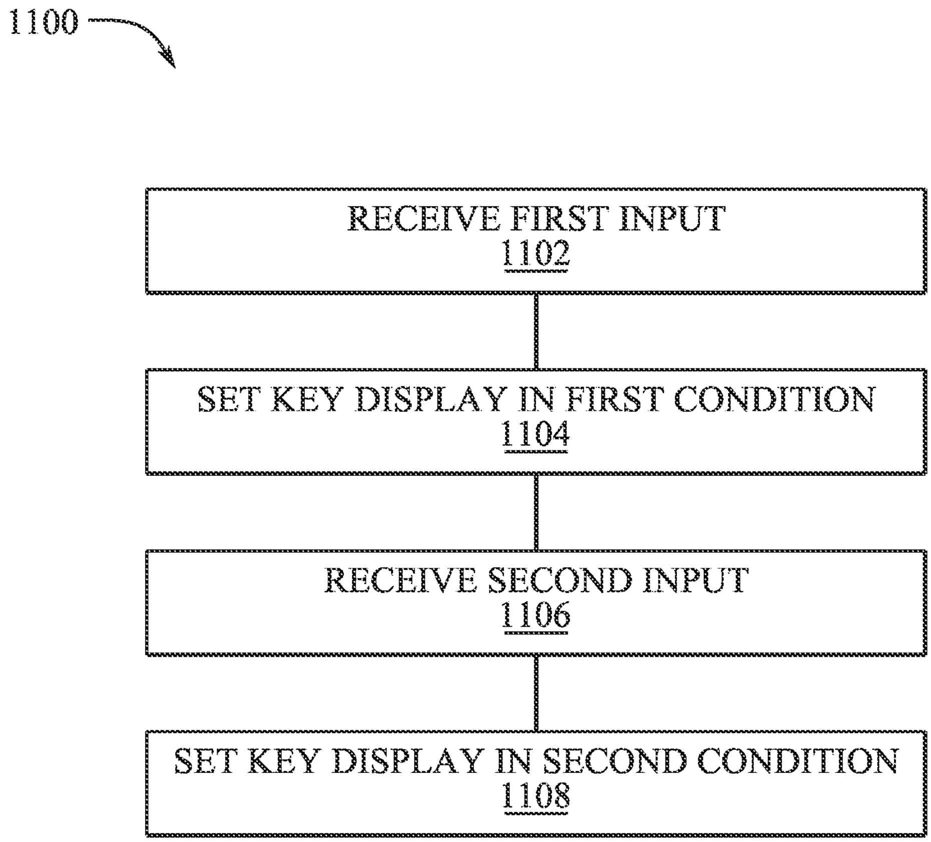
FIG. 11 is a flow diagram illustrating a method of the present disclosure.

FIG. 11 is a process flow diagram illustrating a method 1100 of the present disclosure. At block 1102, a controller can receive a first input. The controller can include, for example, the processor 1002 or a keyboard controller via the input device adapter 1016 or network interface 1012. The first input can include user input (e.g., a user providing a command), a computer generated input (e.g., an input resulting from operation of an algorithm or instructions 1024), or an operation or movement of the computer system 1000 (e.g., turning on access to the power source 1008, attaching the input device 1036 to the computer system 1000, or moving the computer system 1000).

In block 1104, the controller can set at least one key display of a keyboard (e.g., 1034) into a first condition. The first condition can be an off state, wherein the key display provides no light and is therefore invisible to an unaided human eye (e.g., as shown in FIG. 3A). In another embodiment, the first condition can be an on state, wherein the key display provides light with a first glyph shape/size/number, symbol, animation, or visual appearance (e.g., hue, saturation, brightness, etc.).

In block 1106, the controller can receive a second input. The second input can include user input (e.g., a user providing a command), a computer generated input (e.g., an input resulting from operation of an algorithm or instructions 1024), or an operation or movement of the computer system 1000 (e.g., turning on access to the power source 1008, attaching the input device 1036 to the computer system 1000, or moving the computer system 1000). The second input can be a different input from the first input, such as being provided differently (e.g., by a different key, button, program function, or similar means) or at a different time or place as compared to the first input. In response to receiving the second input, the controller can set the key display in a second condition, as shown in block 1108. In the second condition, the key display can be illuminated or can provide a different glyph as compared to the key display in the first condition.

In an example embodiment, the key display in the first condition of block 1104 can be invisible to an unaided human eye (e.g., in the manner described above), and the key display in the second condition of block 1108 can be visible due to light emitted through microperforations or through a one-way reflective material overlaying the key display (e.g., in the manner described above). Thus, methods of the present disclosure can implement various visibility modes for displays within keyboard keys. Additionally, in a situation where the key displays are already on while in the first condition, the key display information can be changed from one set of symbols or shapes to another set of symbols or shapes.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A keycap, comprising:

an upper body including a top surface and sidewalls;

a display positioned under the keycap and including a plurality of light sources, the sidewalls laterally extending around the display; and a plurality of microperforations defined through the top surface of the upper body and each microperforation of the plurality of microperforations includes a first end and a second end opposite the first end;

wherein:

each light source of the plurality of light sources is configured to direct light through the upper body from the first end of a respective microperforation of the plurality of microperforations to the second end of the respective microperforation, wherein all of the light is directed through the plurality of microperforations with none of the light directed through the sidewalls of the keycap; and the plurality of microperforations is configured to generate a glyph when the light is directed though the plurality of microperforations.

2. The keycap of claim 1, wherein the plurality of microperforations are at least partially filled by a filler material.

3. The keycap of claim 2, wherein the filler material includes a partially opaque material.

4. The keycap of claim 1, wherein the upper body at least partially includes a metal portion across the top surface and through which the plurality of microperforations are formed.

5. The keycap of claim 1, wherein the keycap is positioned in a key web, and a first material of the keycap and a second material of the key web match in appearance.

6. The keycap of claim 5, wherein the first material and the second material appear to an unaided human eye to share a same visual reflectivity, surface texture, color, and opacity/transparency/translucency.

7. The keycap of claim 5, wherein the plurality of microperforations are arranged in a rectangular grid, and each microperforation of the plurality of microperforations extends through the top surface with the first end and the second end of each microperforation of the plurality of microperforations defining a thickness of the top surface.

8. A keyboard, comprising:

a housing including a top surface, the top surface having a housing surface appearance;

a keycap positioned in the housing, the keycap including an outer surface and defining an array of perforations, the outer surface having a keycap surface appearance; and an array of light sources configured to direct light through the keycap via the array of perforations when the keyboard is in an activated configuration;

wherein:

when the keyboard is in the activated configuration, the array of perforations generates a glyph appearing to float above the housing and visible through the outer surface of the keycap; and when the keyboard is in a deactivated configuration, the keycap surface appearance matches the housing surface appearance.

9. The keyboard of claim 8, wherein the housing and the keycap each comprise a metal material.

10. The keyboard of claim 8, further comprising a key web framing the keycap.

11. The keyboard of claim 10, wherein when the keyboard is in the deactivated configuration, a key web surface appearance of the key web matches the keycap surface appearance.

12. The keyboard of claim 10, wherein the key web comprises a metal material.

13. The keyboard of claim 12, wherein the array of perforations is configured to generate a plurality of glyphs when the keyboard is in the activated configuration, and wherein each glyph of the plurality of glyphs is different from other glyphs of the plurality of glyphs.

14. The keyboard of claim 10, further comprising:

a plurality of keycaps including the keycap, wherein:

each keycap of the plurality of keycaps is framed by the key web;

each keycap of the plurality of keycaps is coupled with a respective array of light sources; and each keycap of the plurality of keycaps is configured to display a respective floating glyph via the respective array of light sources, each respective floating glyph having a different appearance relative to other floating glyphs of the plurality of keycaps.

15. The keyboard of claim 8, wherein the array of perforations is invisible to an unaided human eye when the keyboard is in the deactivated configuration.

16. The keyboard of claim 8, wherein each light source of the array of light sources corresponds to a single perforation of the array of perforations.

17. A keyboard, comprising:

a chassis having a first surface appearance;

a keycap positioned in the chassis and including an upper body having a bottom surface;

a display positioned under the keycap and including a plurality of light sources; and an opaque layer positioned between the upper body and the display and adjacent to the bottom surface of the upper body, the opaque layer defining a plurality of microperforations and having a second surface appearance;

wherein:

each light source of the plurality of light sources is configured to direct light through a respective microperforation of the plurality of microperforations;

the plurality of microperforations is configured to generate a glyph when the light is directed though the plurality of microperforations; and the first surface appearance of the chassis matches the second surface appearance of the opaque layer.

18. The keyboard of claim 17, wherein the chassis includes a rigid web surrounding the keycap, wherein the first surface appearance is on the rigid web.

19. The keyboard of claim 17, wherein the chassis includes a rigid web, and wherein:

the rigid web includes a top layer and a lower layer, the top layer having a top layer appearance;

the top layer appearance matches a keycap top surface appearance of the keycap; and the lower layer and the opaque layer have matching surface appearances.

20. The keyboard of claim 17, wherein the chassis includes a rigid web, wherein:

the rigid web includes a top layer and a lower layer below the top layer;

the top layer and the upper body of the keycap each include a transparent material; and the first surface appearance is on the lower layer.

* * * * *